US011943416B2

(12) United States Patent
Irwin, Jr. et al.

(10) Patent No.: US 11,943,416 B2
(45) Date of Patent: Mar. 26, 2024

(54) INSTANT TICKET REDUNDANCY VIA MULTI-CHROMATIC INDICIA WITH PHOTORECEPTOR SENSITIVITY TO DIFFERENT WAVELENGTHS OF LIGHT

(71) Applicant: Hydragraphix LLC, Providence, RI (US)

(72) Inventors: Kenneth Earl Irwin, Jr., Dawsonville, GA (US); Fred W Finnerty, Dawsonville, GA (US)

(73) Assignee: Hydragraphix LLC, Providence, RI (US)

( * ) Notice: Subject to any disclaimer, the term of this patent is extended or adjusted under 35 U.S.C. 154(b) by 0 days.

(21) Appl. No.: 18/318,823

(22) Filed: May 17, 2023

(65) Prior Publication Data

US 2023/0336676 A1    Oct. 19, 2023

Related U.S. Application Data

(63) Continuation of application No. 17/606,627, filed as application No. PCT/US2020/032011 on May 8, 2020, now Pat. No. 11,706,372.

(Continued)

(51) Int. Cl.
| | |
|---|---|
| *H04N 1/60* | (2006.01) |
| *A63F 3/06* | (2006.01) |
| *H04N 1/50* | (2006.01) |

(52) U.S. Cl.
CPC ......... *H04N 1/6027* (2013.01); *A63F 3/0655* (2013.01); *H04N 1/506* (2013.01);
(Continued)

(58) Field of Classification Search
CPC .... H04N 1/506; H04N 1/6008; H04N 1/6027; H04N 1/6088; A63F 3/0655; A63F 3/0665
See application file for complete search history.

(56) References Cited

U.S. PATENT DOCUMENTS 7,665,400 B2    2/2010 Duke
8,546,301 B2   10/2013 Ribi et al.
(Continued)

FOREIGN PATENT DOCUMENTS

| WO | 2017070195 A1 | 4/2017 |
| WO | 2018013520 A1 | 1/2018 |
| WO | 2019008357 A1 | 1/2019 |

OTHER PUBLICATIONS

"Court Rules Woman Out Of Luck With Lottery Misprint", https://miami.cbslocal.com/2015/05/27/court-rules-woman-out-of-luck-with-lottery-misprint/, May 27, 2015.
"International Search Report and Written Opinion", from corresponding PCT/US2020/032011 (12 pages), dated Oct. 12, 2020.
"New Mexico man told $500,000 winning lottery ticket is a 'misprint'", https://abc13.com/lottery-ticket-scratch-off-misprint/463695/, Jan. 6, 2015.
(Continued)

*Primary Examiner* — Scott A Rogers
(74) *Attorney, Agent, or Firm* — Neal, Gerber & Eisenberg LLP

(57) ABSTRACT

A redundantly printed security-enhanced document, printing method, and system for better ensuring that the meaning of the information imparted by variable indicia printed by redundant printing indicia on a document protected by a removable Scratch-Off Coating (SOC). By printing the variable indicia with multiple colors, redundancy and integrity of the intended indicia is achieved relative to the perception of human eye photoreceptor cones. The redundantly printed document, methods, and systems enhance the overall appearance of the redundantly printed document, and reduce possible consequences resulting from misprinted variable indicia.

20 Claims, 24 Drawing Sheets
(23 of 24 Drawing Sheet(s) Filed in Color)

Related U.S. Application Data

(60) Provisional application No. 62/920,604, filed on May 8, 2019.

(52) U.S. Cl.
CPC ......... *H04N 1/6008* (2013.01); *H04N 1/6088* (2013.01); *A63F 3/0665* (2013.01)

(56) References Cited

U.S. PATENT DOCUMENTS

| | | | |
|---|---|---|---|
| 9,861,883 | B1 | 1/2018 | Gaynor et al. |
| 10,183,213 | B2* | 1/2019 | Irwin, Jr. ................... B41J 2/32 |
| 10,232,247 | B2 | 3/2019 | Finnerty et al. |
| 10,252,555 | B2 | 4/2019 | Finnerty |
| 10,377,162 | B2 | 8/2019 | Finnerty et al. |
| 10,456,661 | B2 | 10/2019 | Finnerty et al. |
| 10,752,035 | B2 | 8/2020 | Finnerty et al. |
| 2017/0209780 | A1* | 7/2017 | Irwin, Jr. ............... B42D 25/27 |
| 2022/0161584 | A1 | 5/2022 | Finnerty et al. |

OTHER PUBLICATIONS

"This Is the Most Visible Color in the World", https://www.mentalfloss.com/article/500751/most-visible-color-world, May 10, 2017.

"Weber's Law", https://www.cis.rit.edu/people/faculty/montag/vandplite/pages/chap_3/ch3p1.html, available prior to May 8, 2019.

"Why can our eyes see yellow faster than other colours?", https://www.quora.com/Why-do-yellow-colors-appear-first-to-human-eyes?share=1; available prior to May 8, 2019.

Burgess, Arthur E., "The Rose model, revisited", J. Opt. Soc. Am. A, vol. 16, No. 3, Mar. 1999, 633-646.

Laughlin, Simon, "A Simple Coding Procedure Enhances a Neuron's Information Capacity", https://www.degruyter.com/document/doi/10.1515/znc-1981-9-1040/html, 910-912.

Purves, D., et al., "Cones and Color Vision", Neuroscience. 2nd edition. Sunderland (MA): Sinauer Associates; 2001. Available from: https://www.ncbi.nlm.nih.gov/books/NBK11059/.

* cited by examiner

INSTANT TICKET REDUNDANCY VIA MULTI-CHROMATIC INDICIA WITH PHOTORECEPTOR SENSITIVITY TO DIFFERENT WAVELENGTHS OF LIGHT

PRIORITY CLAIM

This patent application is a continuation of, claims priority to and the benefit of U.S. patent application Ser. No. 17/606,627, having a 371(c) filing date of Oct. 26, 2021, which patent application is a national stage application of PCT/US2020/032011, filed on May 8, 2020, which claims priority to and the benefit of U.S. Provisional Patent Application No. 62/920,604, filed May 8, 2019, the entire contents of which are incorporated herein by reference.

BACKGROUND

The present disclosure relates generally to documents, such as instant lottery tickets, having variable indicia under a Scratch-Off Coating (SOC). Specifically, the present disclosure relates to methods and devices for providing inherent redundancy of the variable indicia of SOC documents by utilizing process colors that ensure contrast ratios between various wavelengths of reflected light relative to human eye photoreceptor sensitivity.

Lottery scratch-off or instant ticket games have become a time-honored method of raising revenue for state and federal governments the world over. The concept of hiding indicia information under a Scratch-Off Coating (SOC) has also been applied to numerous other products such as commercial contests, telephone card account numbers, gift cards, etc. Literally, billions of scratch-off products are printed every year where the Scratch-Off-Coatings (SOCs) are used to ensure that the product has not been previously used, played, or modified.

The variable indicia may be printed using a specialized high-speed ink jet printer or imager with a water-soluble dye. The variable indicia may be monochromatic black or in some cases red in color, and each type of variable indicia may be imaged as a discrete spot color (i.e., monochromatic).

This use of single spot color printing for variable indicia imaging has repeatedly proven to be problematic with spot color inkjet heads partially clogging, such that a portion of the variable indicia prints while other portions do not. For example, in January 2015, a Roswell, New Mexico lottery player (John Wines) believed he won $500,000 in a "Ruby 7s" instant ticket key number match lottery game. As illustrated in FIGS. 1A and 1B, the lottery player believed that he was holding a winning ticket 100 (and 100' which is a magnified view of the ticket 100) because the key number match indicium was "1" and the lottery ticket misprint made the intended indicia numbers of "18" and "13" appear to be two occurrences of the winning key match number "1" as indicated by numerals 101 and 102 of FIG. 1A and 101' and 102' of FIG. 1B (i.e., two $250,000 winners). In this case, the intended second indicia digits "8" and "3" indicated by numerals 103 and 104 respectively barely appeared on the ticket 100 as best shown for magnified ticket 100' of FIG. 1B. The perceived winning ticket 100 (and 100') thus had two misprints due to a partially clogged red inkjet print head causing both of the second indicia digits "8" and "3" to barely appear as indicated by numerals 103 and 104. With this particular misprinted ticket 100 (and 100'), the two associated winning amount indicia 105 and 106 were printed via a separate black inkjet imager head that was not clogged. This ticket had a pristine appearance of the winning amounts—i.e., "$250,000" appearing twice. Thus, even though two separate spot colors (i.e., red and black) were employed to print the variable indicia for ticket 100 (and 100'), the failure of the one red printhead was sufficient to create the appearance of a $500,000 winning lottery ticket.

A similar $500,000 misprint due to clogged inkjet heads occurred with a Florida Lottery ticket as shown in FIG. 1C. In this case, the ticket holder filed a lawsuit against the Florida lottery after they were told their apparent winning ticket was a misprint. Again, in this case of the Florida Lottery, the misprinted ticket 110 displayed misprinted key match indicium 111, which when matched to game indicium 112 readily appeared to be a $500,000 winner. There are many other documented cases of instant lottery ticket misprints due to clogged inkjet imager heads. In various cases, the news media and attorneys claimed that the lottery or the ticket manufacturer should be forced to pay for the apparent misprinted prize value.

Regrettably, these types of instant lottery ticket misprints are almost inevitable. The United States and Canadian lottery instant ticket market was approximately $55 billion, circa 2020. The average instant ticket price is $2.70, which equates to over 20 billion instant tickets printed per annum in 2020 for the United States and Canadian markets. Consequently, with the extremely high quantities of instant tickets printed per annum, any single point of failure (e.g., inkjet print nozzles) will unsurprisingly result in numerous misprints, no matter how diligent the Quality Assurance (QA) program employed by an instant lottery ticket provider. For example, a Six Sigma ($6\sigma$) process is the gold standard of manufacturing process control in which 99.99966% of all opportunities to produce some feature of a part are statistically expected to be free of defects. However, with the vast numbers of instant lottery tickets printed each year, a Six Sigma ($6\sigma$) process for ensuring correctly printed indicia would still produce an expected 68,000 defective lottery tickets per annum. Therefore, even employing extremely stringent Six Sigma ($6\sigma$) QA processes, an unacceptable number of indicia defects will occur inevitably resulting in instant lottery tickets with misprinted values.

Some attempts to mitigate the problem of clogged lottery inkjet misprints have been tried with the incorporation of detailed legal disclaimers, abbreviated captions of indicia, and the development of elaborate automated press monitoring systems. However, legal disclaimers do nothing to mitigate bad news resulting from misprinted lottery tickets do not stop lawsuits. Additionally, most players do not notice indicia captions due to small size and abbreviated spelling. For example, FIG. 1D shows a magnification of a Florida ticket 110' misprinted key match indicia 113 and associated abbreviated caption 114. Automated press monitoring systems have in practice proved to be both expensive and unreliable. For example, the previously cited New Mexico Lottery misprinted ticket 100 and 100' of FIGS. 1A and 1B and the Florida Lottery misprinted ticket 110 and 110' of FIGS. 1C and 1D were both printed with the support of an automatic press monitoring system.

Certain proposals for mitigating false perceptions of misprinted indicia have been proposed. In one proposal, variable indicia printed redundancy is achieved by imaging component colors in a non-overlapping manner such as shown in FIG. 1E, including the indicia 120 (and 120' in magnified view). However, the printed images produced by this proposal can result in esthetically unappealing variable indicia (e.g., the fuzzy brown appearing actual size indicium 120 of FIG. 1E). In another proposal, variable indicia printed redundancy is achieved by printing the variable indicia with process colors. Since process colors can be comprised of two, three, four, or more different separate component colors (e.g., Cyan, Magenta, Yellow, and blacK—a.k.a. "CMYK") with each component color applied by a separate print head, so long as at least two different component colors are utilized to print each process color variable indicium, the this proposal suggests that redundancy will be achieved assuming each component color is legible if printed individually. For example, this proposal assume a 15% minimum gray scale threshold is necessary to ensure component color legibility. For this proposal, as illustrated in FIG. 1F, yellow 131 could never be utilized as a redundant component color because an 100% application of the color yellow ink 131 (i.e., completely saturated with the color) only equates to a 12% grayscale 132 level.

It is therefore desirable to develop methodologies for better ensuring the redundancy and integrity of variable indicia that enhances the aesthetics of a lottery ticket or other document.

BRIEF SUMMARY

The present disclosure relates to a redundantly printed security-enhanced document including a substrate and process color variable indicia representing variable information printed on the substrate. The process color variable indicia including a plurality of component colors. Each component color is selected to manifest a grayscale equivalent level greater than a predetermined minimum threshold when viewed in any of red, green, or blue channels of an additive color model, such that at least two of the component colors of the process color variable indicia covey a meaning of the variable information of the process color variable indicia when viewed in at least one channel of the additive color model. The document also includes a scratch-off coating covering at least a portion of the process color variable indicia.

The present disclosure also relates to a method of producing a redundantly printed security-enhanced document including a substrate with process color variable indicia representing variable information and printed on the substrate, wherein the process color variable indicia includes a plurality of component colors. The method includes determining a variable indicia illuminating light color temperature, determining, utilizing an additive color model, a grayscale equivalent level of each component color of the process color variable indicia with each of Red, Green, and Blue (RGB) channels, and determining each of the component colors of the process color variable indicia to ensure that the component colors exhibit a grayscale equivalent level greater than or equal to a predetermined threshold in at least one channel of an additive color model, such that a failure of the printing any one of the component colors of the process color variable indicia does not alter a meaning of the variable information represented by the other component color of the variable indicia. The method also includes sending instructions intended to cause print heads to print the component colors to form the process color variable indicia on the substrate with separate print heads, and applying a scratch-off coating covering at least a portion of the process color variable indicia.

The present disclosure also relates to redundantly printed process color variable indicium conveying variable information, the process color variable indicium including a plurality of component colors with each component color determined with a grayscale equivalent level greater than a predetermined minimum threshold when viewed in any of red, green, or blue channels of an additive color model, such that at least two of the component colors comprising the variable indicium coveys a meaning of the variable information of the process color variable indicium when viewed in at least one channel of the additive color model. A scratch-off coating covers at least a portion of the printed variable indicia.

BRIEF DESCRIPTION OF THE SEVERAL VIEWS OF THE DRAWINGS

The patent or application file contains at least one drawing executed in color. Copies of this patent or patent application publication with color drawings will be provided by the Office upon request and payment of the necessary fee.

DETAILED DESCRIPTION

Certain terminology is used herein for convenience only and is not to be taken as a limitation on the present disclosure. As used herein, the words "image" or "print" are used equivalently and mean that whatever indicium or indicia is or are created directly or indirectly on any substrate or surface may be done by any known imaging or printing method or equipment. Likewise, "imaging" or "printing" describing a method and "imaged" or "printed" describing the resulting indicium or indicia are used equivalently and correspondingly to "image" or "print."

The words "a" and "an", are meant to include "at least one." The terms "scratch-off game piece" or other "scratch-off document," hereinafter is referred to generally as an "instant ticket" or simply "ticket." The terms "full-color" and "process color" are also used interchangeably as terms of convenience for producing a variety of colors by discrete combinations of applications of pigmented primary inks or dyes "CMYK" (i.e., Cyan, Magenta, Yellow, and blacK), or in some cases six colors (e.g., Hexachrome printing process uses CMYK inks plus Orange and Green inks), or alternatively eight colors—e.g., CMYK plus lighter shades of cyan (LC), magenta (LM), yellow (LY), and black (YK).

Figure 1A:
FIG. 1A is a front view of an actual lottery ticket from the New Mexico Lottery that appeared to the player to be a $500,000 winner due to a single clogged inkjet head using two monochromatic spot colors.
Figure 1B:
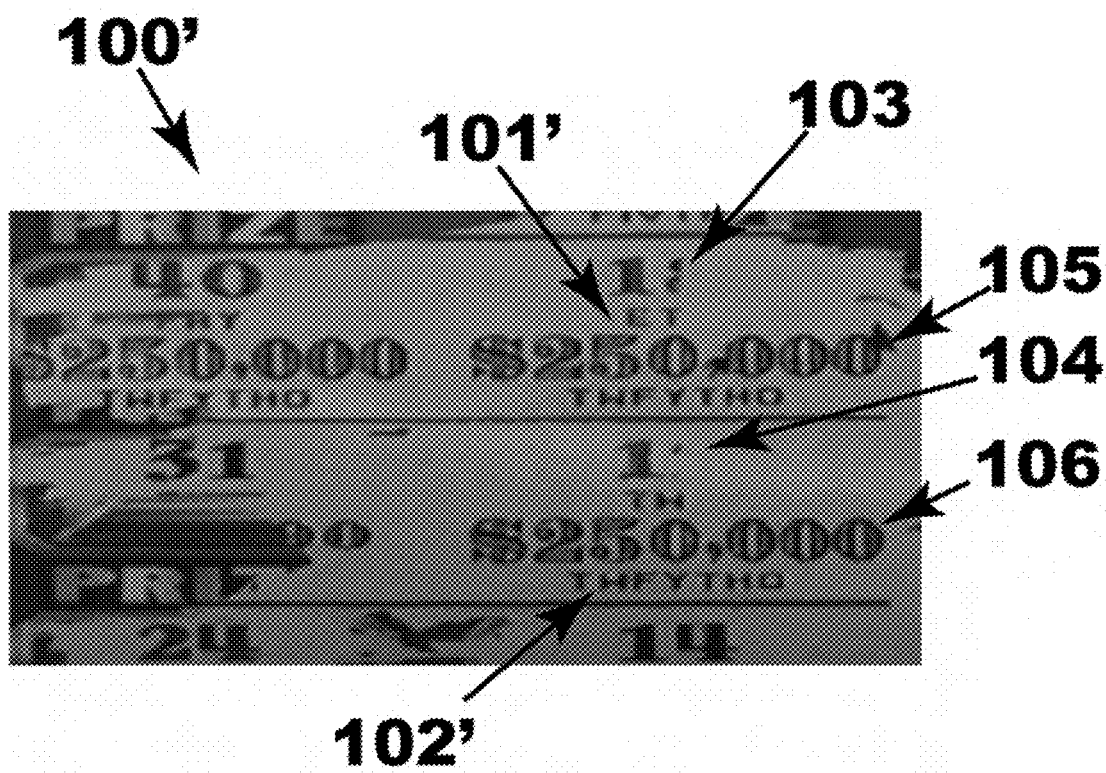
FIG. 1B is a detailed magnified view of a portion of interest of the exemplary lottery ticket from the New Mexico Lottery of FIG. 1A.
Figure 1C:
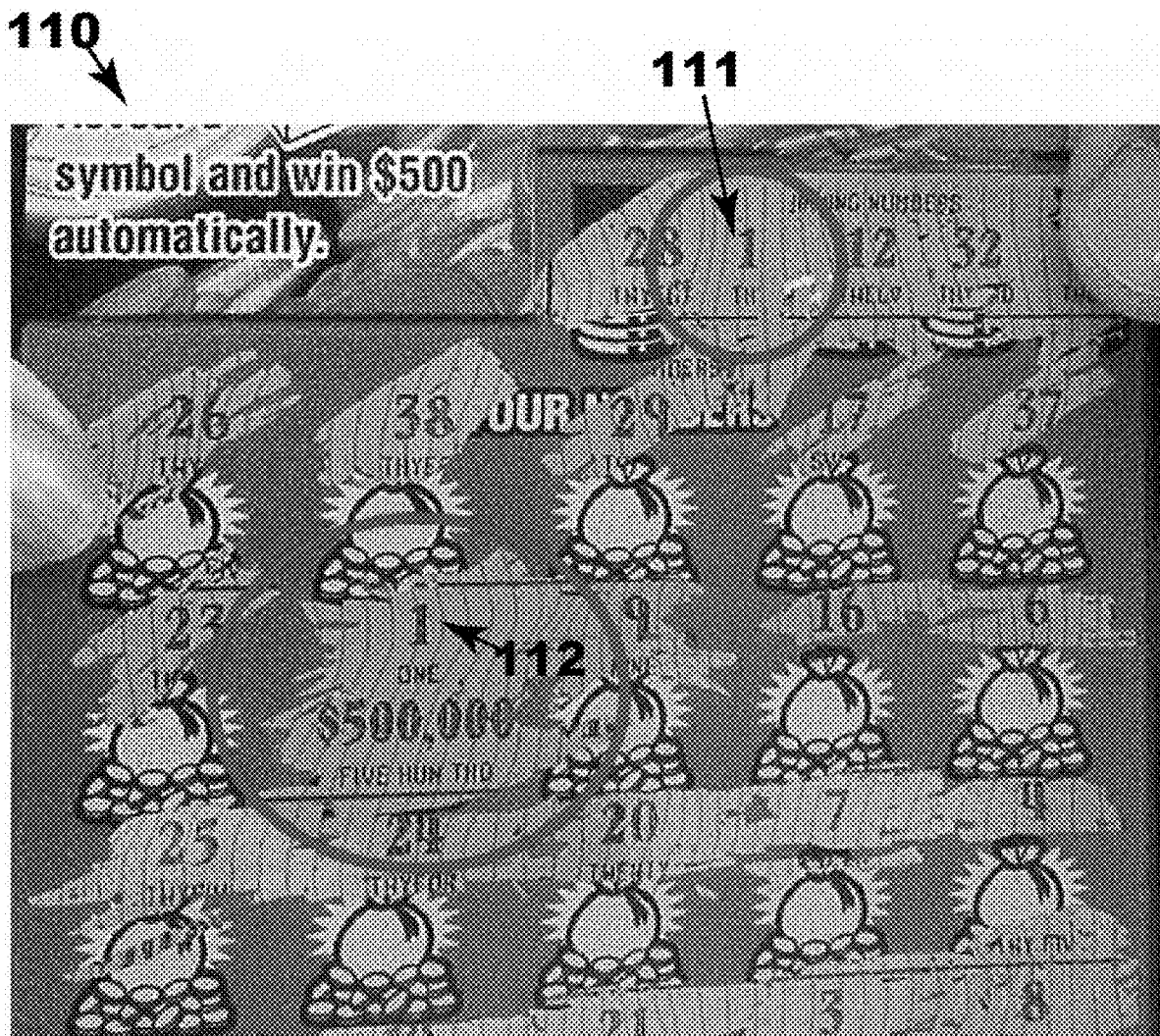
FIG. 1C is a front view of an actual lottery ticket from the Florida Lottery that appeared to the player to be a $500,000 winner due to a single clogged inkjet head using a monochromatic spot color.
Figure 1D:
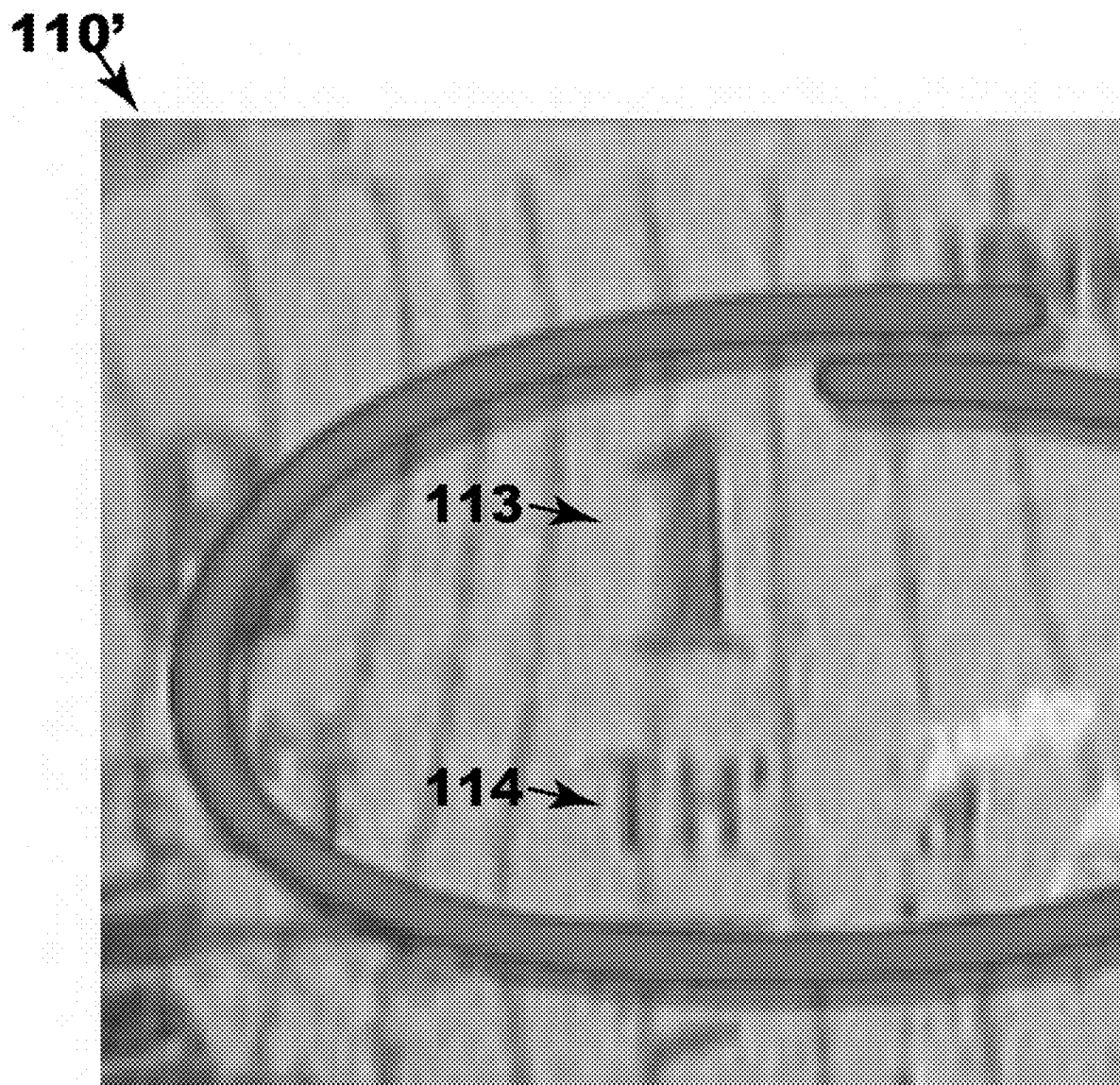
FIG. 1D is a detailed magnified view of the lottery ticket of FIG. 1C highlighting the misprint and the associated abbreviated caption.
Figure 1E:
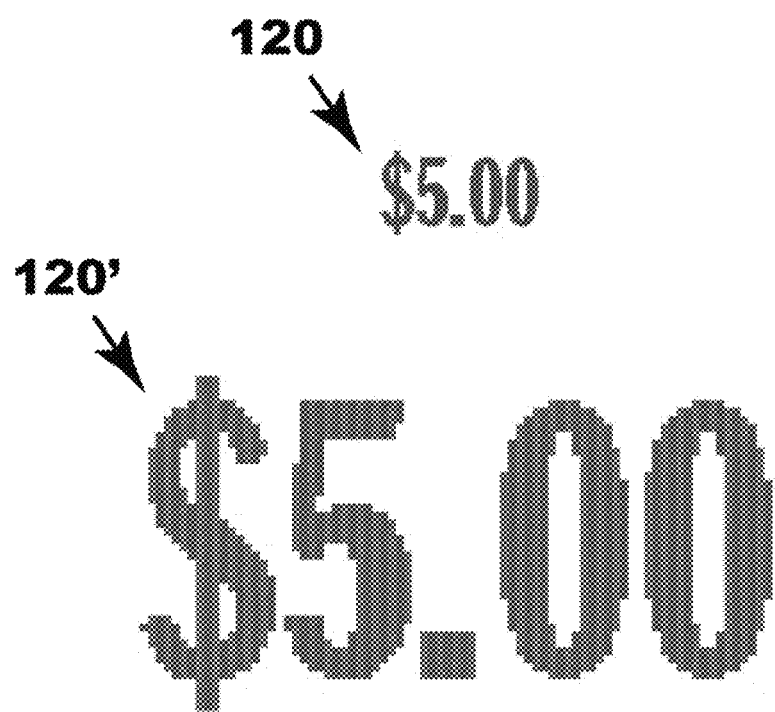
FIG. 1E is a front view and a detailed magnified view of proposed indicia redundancy via component colors printed in a non-overlapping manner.

The term "composite color" refers to two or more of the individual colors used to comprise an overall "process color" with the term "component color" referring to one individual color that is used with at least one other component color to create a combined "composite" or "process" color. The term "spot color" as used herein refers to a color that is intended to be printed and displayed by itself and not intended to be utilized as a "composite color" or "process color". An example of two "spot colors" is provided in FIG. 1B comprised of red as indicated by numerals 103 and 104 and black as indicated by numerals 105 and 106 "spot colors."

The terms "multi" or "multiple" or similar terms means at least two, and may also mean three, four, or more, for example, unless otherwise indicated in the context of the use of the terms. The term "variable" indicium or indicia refers to imaged indicia which indicates information relating a property, such as, without limit, a value of the document, for example, a lottery ticket, coupon, commercial game piece or the like, where the variable indicium or indicia is or are typically hidden by a Scratch-Off Coating (SOC) until the information or value is authorized to be seen, such as by a purchaser of the document who scratches off the SOC, revealing the variable indicium or indicia. Examples of variable indicium as a printed embodiment include letters, numbers, icons, or figures. The terms "lottery scratch-off ticket", "commercial contest scratch ticket", "telephone card account number card", "scratch-off gift cards", or simply "scratch-off card" for convenience are all referred to as an "instant ticket" or more simply "ticket" throughout the present disclosure.

The terms "subtractive color" and "additive color" models define two different color systems dependent on the medium referenced. "Subtractive color" predicts the spectral power distribution of light after it passes through successive layers of partially absorbing media. "Subtractive color" is the model of how dyes and inks are used in color printing and photography where the perception of color is elicited after white light passes through microscopic layers of partially absorbing media allowing some wavelengths of light to reach the eye and not others. The three primary "subtractive colors" are: Cyan, Magenta, and Yellow (CMY). "Additive color" is the color model that predicts the appearance of colors made by coincident component lights with distinct colors. In other words, "additive color" predicts perception and not any sort of change in the photons of light themselves. The three primary "additive colors" are: Red, Green, and Blue (RGB).

Before describing the present disclosure, it is useful to first provide a brief description of how the human eye perceives color via photoreceptor cones to ensure that a common lexicon is established. This description of how human eyes perceive color via photoreceptor cones is provided in the discussions of FIGS. 2A thru 2C.

Figure 2A:
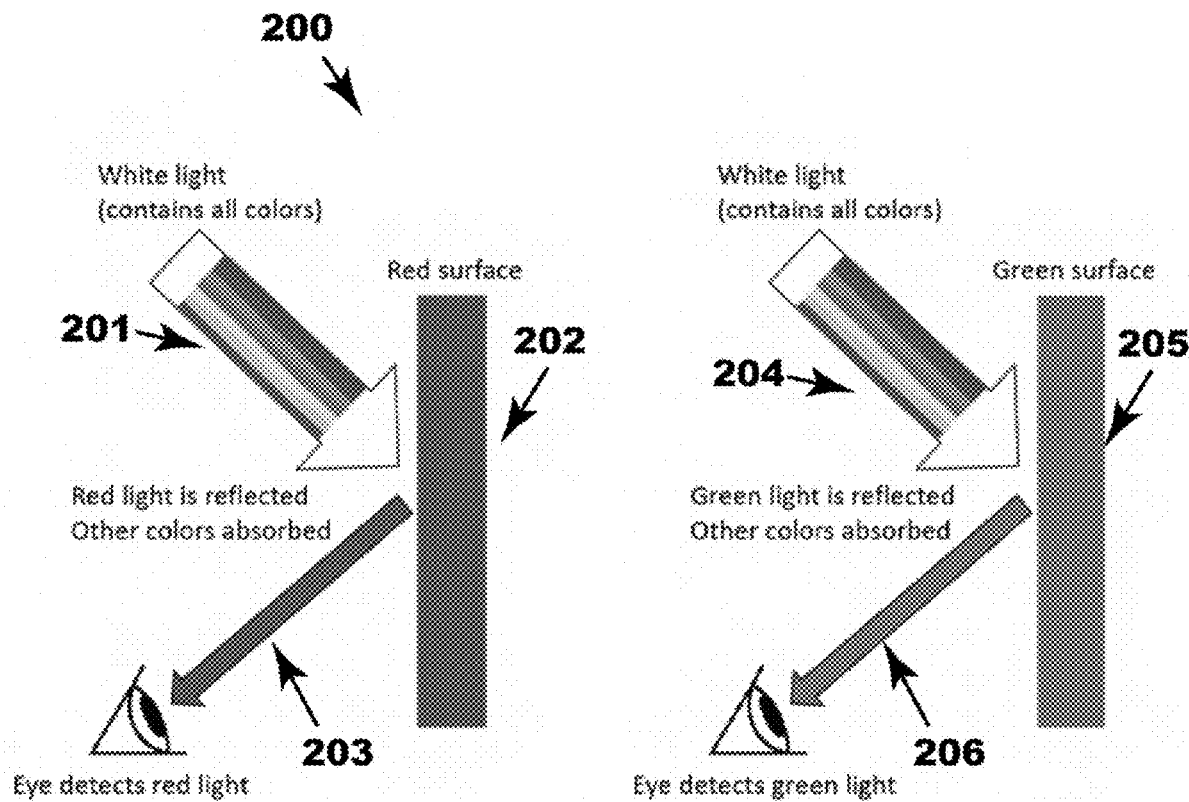
FIG. 2A is a diagrammatic view of white light illuminating two objects with red or green light reflected off each object.

By definition, visible (white) light is the part of the electromagnetic spectrum (i.e., wavelengths between 380 nano meters or "nm" to 760 nm) that the human eye can detect. Thus, visible white light (e.g., sunlight) is comprised of all the colors that can be seen by the human eye. When white light strikes an object a portion of the spectrum is typically absorbed (the exceptions being white objects that reflect all visible wavelengths and black objects that absorb all visible wavelengths) with the non-absorbed portion of the spectrum reflected and perceptible by the human eye. For example, FIG. 2A provides two exemplary illustrations 200 of white light 201 and 204 illuminating a red surface 202 and a green surface 205, respectively. The red surface 202 is shown absorbing all of the visible light except red light 203, which is reflected 203 and therefore detectable to the human eye. The green surface 205 behaves in a similar manner, and the green surface 205 absorbs all of the visible light except green light 206, which is reflected 206 and detectable to the human eye.

However, all light sources do not necessarily embody the full visible white light spectrum. When portions of the visible light spectrum are missing from the light source, the quality of the light is defined in terms of a theoretical blackbody radiator heated to varying degrees on the Kelvin (K) temperature scale, with lower temperatures containing more red light and higher temperatures containing more blue light. For example, studio white lights typically emit light at 3,200° K, candle and sunrise or sunset light emissions are around 1,850° K, standard incandescent light is around 2,400° K, standard fluorescent lamp light is around 5,000° K, and an overcast daylight day is around 6,500° K. If portions of the visible light spectrum are missing from the light source, the amount and type of light reflected from an object will differ. For example, the two exemplary illustrations 200 of FIG. 2A display the light sources 201 and 204 emitting white light (e.g., at 3,200° K). If the light sources 201 and 204 were instead emitting mostly red light (e.g., at 1,850° K), the red surface 202 would still appear red because red light 203 would still be reflected from it; but, the green surface 205 would appear black or dark gray because no green light 206 would be reflected, since green light was not present in the light source 204.

Figure 2B:
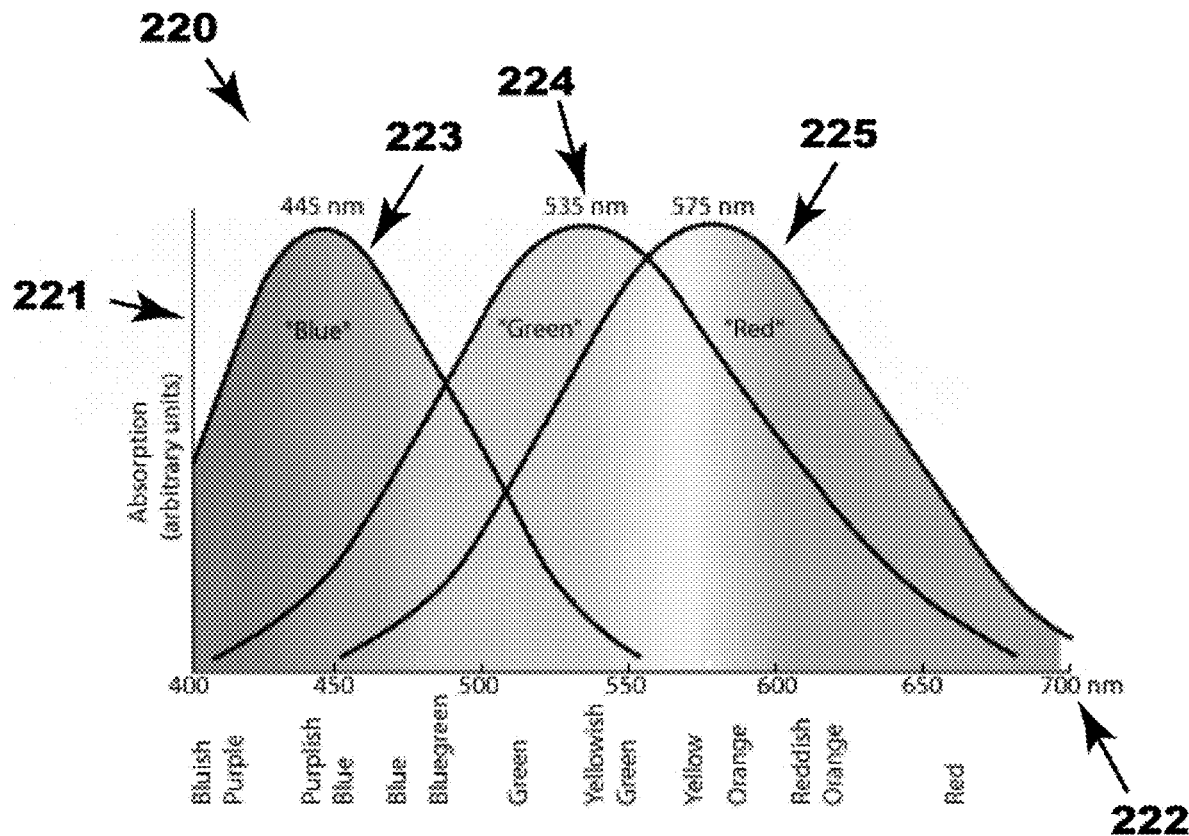
FIG. 2B is a graph of a known chromatic absorption of the three photoreceptor cones commonly found in the human eye.

Any reflected light that contacts a human eye is ultimately focused onto the light-sensitive retina at the back of the eye. The retina itself is comprised of tens of millions of photo-receptors that are either single photopigment "rods" (i.e., can "see" only varying degrees of gray in dim lighting conditions) or one of three types of "cones" where the three cone types differ in the photopigment they contain, this difference in photopigments enable a human's ability to see color. Each of these three photopigments has a different sensitivity to light of different wavelengths, and for this reason are referred to as "Blue," "Green," and "Red," or, more appropriately, Short (S), Medium (M), and Long (L) wavelength cones, terms that more or less describe their spectral sensitivities. FIG. 2B provides a graph 220 of the three types of cones "blue" or "S" 223, "green" or "M" 224, and "red" or "L" 225 of the wavelength of the visible light spectrum in nano meters (nm) charted on the horizontal axis 222 or abscissa and the cone's relative sensitivity to a particular wavelength charted on the vertical axis 221 or ordinate. As apparent from graph 220, each of the three cone's sensitivity is an approximate Gaussian distribution with averages centered about three different wavelengths—i.e., "blue" 223 at 445 nm, "green" 224 at 535 nm, and "red" 225 at 575 nm. As is also apparent from graph 220, there is significant overlap between the sensitivity Gaussian distributions of the three cones, particularly the "green" 224 and "red" 225 cones.

In addition to asymmetrical overlapping of cone sensitivity curves, the quantity of each type of cone present in the eye is not evenly proportioned. About 64% of the cones respond most strongly to red light, while about 34% respond mostly to green light. Only 2% of the cones respond strongest to blue light. Further, the lens and cornea of the eye tend to block shorter wavelengths, thereby further reducing sensitivity to blue and violet light.

Consequently, some colors are perceived by a human observer with greater luminescence intensity than other colors. Blue, green, and red colors are more intense (assuming the same number of photons are exciting the cones in each case) if the photon's excitation wavelength is near the Gaussian distribution centered averages—i.e., "blue" 223 at 445 nm, "green" 224 at 535 nm, and "red" 225 at 575 nm. Additionally, most colors are wavelengths of light that are received by more than one type of cone. For example, the color yellow is received by both the "green" 224 and "red" 225 cones that become highly excited since the yellow light wavelength (i.e., 570 to 580 nm) is near both cones' peak sensitivity. With the exception of the color white (all cones excited), the color yellow is the second highest level of excitation the human eye can experience. Thus, the color yellow appears to a human to be the brightest in the spectrum.

Figure 2C:
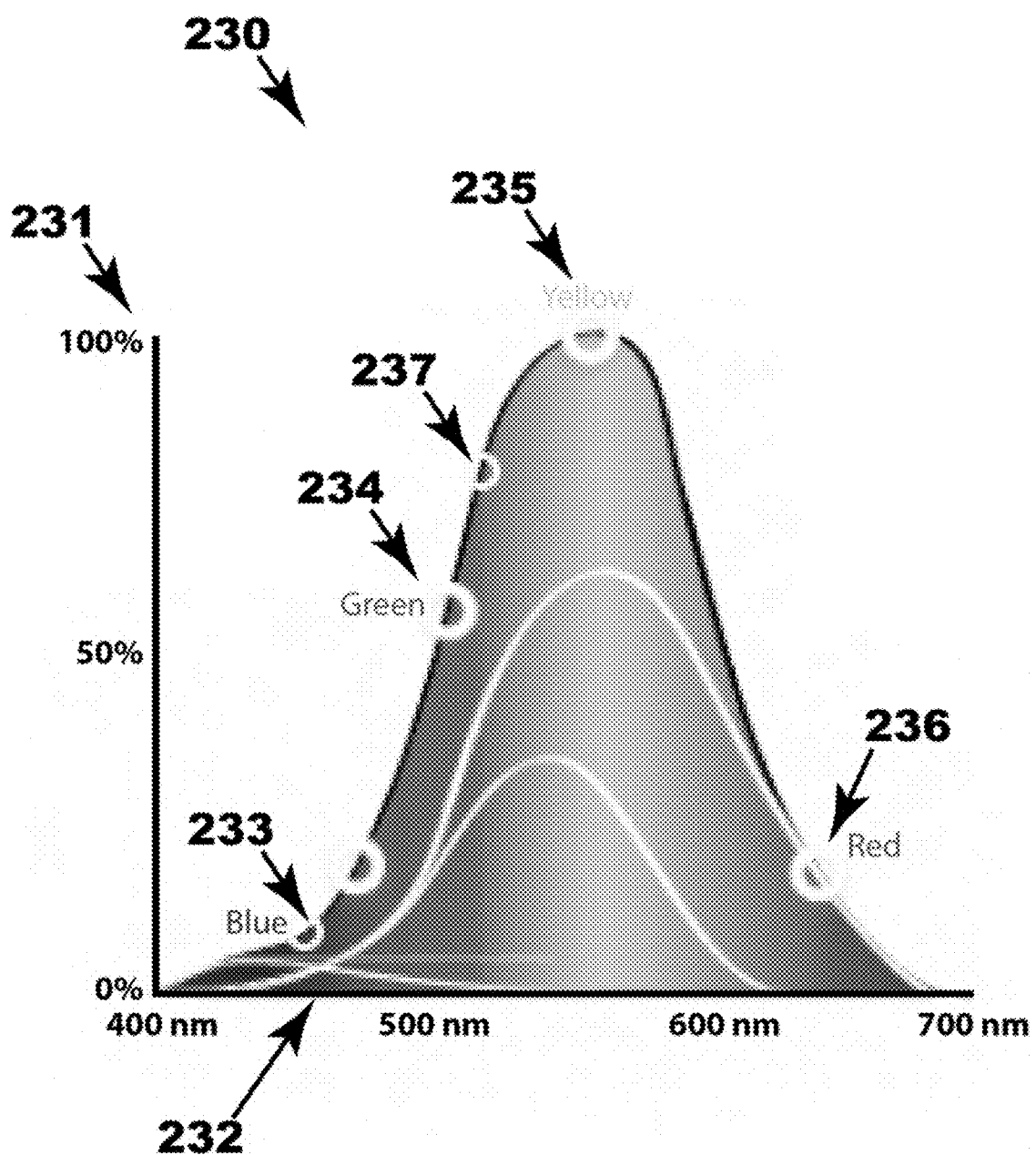
FIG. 2C is a graph of a known gaussian distribution of color intensity perception of the human photoreceptor sensitivity as a consequence of the chromatic absorption graph of FIG. 2B and the amount of each different type of photoreceptor cones commonly found in the human eye.

An approximation of the human eye's disproportionate sensitivity to the different visible color wavelengths is graphed 230 in FIG. 2C. Similar to before, with graph 230 the wavelength of the visible light spectrum in nano meters (nm) is charted on the horizontal axis 232 or abscissa with a human's relative sensitivity to a particular wavelength or color charted on the vertical axis 231 or ordinate. As shown in graph 230, the combined overlap between the "green" 224 and "red" 225 cones (FIG. 2B), merged with the disproportioned quantity of each type of cone present in the eye, compounded with the eye's lens and cornea tendency to block shorter wavelengths (i.e., reducing sensitivity to blue and violet light) result in a Gaussian sensitivity distribution of the human perception of the color yellow 235 (FIG. 2C) being observed as the most intense, with the standard color green 234 second intense, the standard color red 236 third intense, and the standard color blue 233 fourth intense. The reported "Most Visible Color in the World" (Ferro Shaunacy, 10th of May 2017, Mental Floss paper) is a shade of green 237 (i.e., 555 nm wavelength) that while not falling on top of curve 230 is near the top with the most visible status attributed to the combination of high luminescence intensity and contrast to typical environments. From this example, it can be seen that not all colors are weighed by the human eye on an equal basis. The differences in color perception and contrast with backgrounds providing significant consideration when determining what objects are typically legible to a human eye.

Reference will now be made in detail to example embodiments of the present disclosure, with one or more embodiments of illustrated in the drawings. Each example embodiment is provided by way of explanation of the present disclosure, and not meant as a limitation of the present disclosure. For example, features illustrated or described as part of one embodiment, may be used with another embodiment to yield still a further embodiment. The present disclosure encompasses these and other modifications and variations as come within the scope and spirit of the disclosure.

Various embodiments of the present disclosure relate to a redundantly printed security-enhanced document comprising a substrate and at least two different variable indicia printed with component colors directly or indirectly on the substrate such that the combined component color indicia create a composite process color variable indicum. The plurality of printed variable indicia are printed in the same general predefined area such that the printed variable indicia overlap or are registered so closely together such that a failure to print one or more portions of any one component color indicium does not alter the meaning of information represented (by the composite process color variable indicum) on the redundantly printed security-enhanced document. Each variable indicium is comprised of a component color that by itself displays sufficient luminescent intensity to remain legible to human eye photoreceptors. In various embodiments, redundancy is achieved via multiple ink applications with separate physically distinct print heads, as a function of the serial application of the individual component colors. In various embodiments, the at least first printed variable indicium and the at least second printed variable indicium are printed using different component colors that combine into the composite process color variable indicium.

In various embodiments, a portion of the composite process color variable indicum at least partially can comprise one or more numerals. Optionally, another portion of the at least composite process color variable indicum can partially comprise one or more words. A portion of the composite process color variable indicum at least can comprise one or more drawings, photographs, or other images.

In certain embodiments, the contrast between the luminescence intensity of the underlying substrate and the luminescence intensity of each component color of the at least two printed variable indicium are selected to ensure legibility of human eye photoreceptors, thereby ensuring the meaning of information represented by the resulting composite process color variable indicum in the event that the printing of one or more portions of either or any of the at least two printed component color variable indicum malfunctions. These embodiments thereby compensate for optical noise variances introduced by less-than-optimal underlying substrate discoloration and/or low contrast as perceived by the human eye.

In various embodiments, the composite process color variable indicia are each composed of at least two separate component colors. Thus, in these embodiments, imaging redundancy relative to human eye photoreceptors is better ensured since the different component colors require different ink applications with the different ink applications providing redundancy due to different application hardware, ink, etc. for each color.

Other objects and advantages of the present disclosure will be set forth in part in the following description, or may be apparent from the present description, or may be learned through practice of the present disclosure. Described below are a number of variable indicia determination process, printing mechanisms, and methodologies that provide practical details for reliably determining and producing redundant indicia under a SOC that are better immune to failure of any one high speed variable ink application system. Although the examples provided herein are primarily related to instant lottery tickets, it is clear that the same methods are applicable to any other type of document (e.g., telephone card, prepaid cards, vouchers, bank security instruments, coupons, etc.) such as where information is protected by a SOC.

As can now be appreciated in view of the previous summary of the present disclosure, in various embodiments printing indicia redundancy is achieved by employing at least two separate component colors to image a combined or composite process color variable indicum. Thus, so long as each component color is legible if printed individually, process color indicia printing redundancy is achieved and consequently the indicia non-defect rate is most probably increased to a percentage well beyond the Six Sigma (6 σ) reliability standard cited in the background section of the present disclosure. While recent proposals teach how to achieve variable indicia redundancy by combining component color indicum embodiments into a composite process color indicum, the criteria for determining component color indicum legibility in such proposal has been primarily structured to accommodate machine garnered metrics and not necessarily optimized for viewing by the human eye. In contrast, while still utilizing machine garnered metrics, the present disclosure teaches how a system can optimize component color indicum legibility from a human eye perspective primarily by utilizing an additive color model instead of subtractive color models.

Figure 3A:
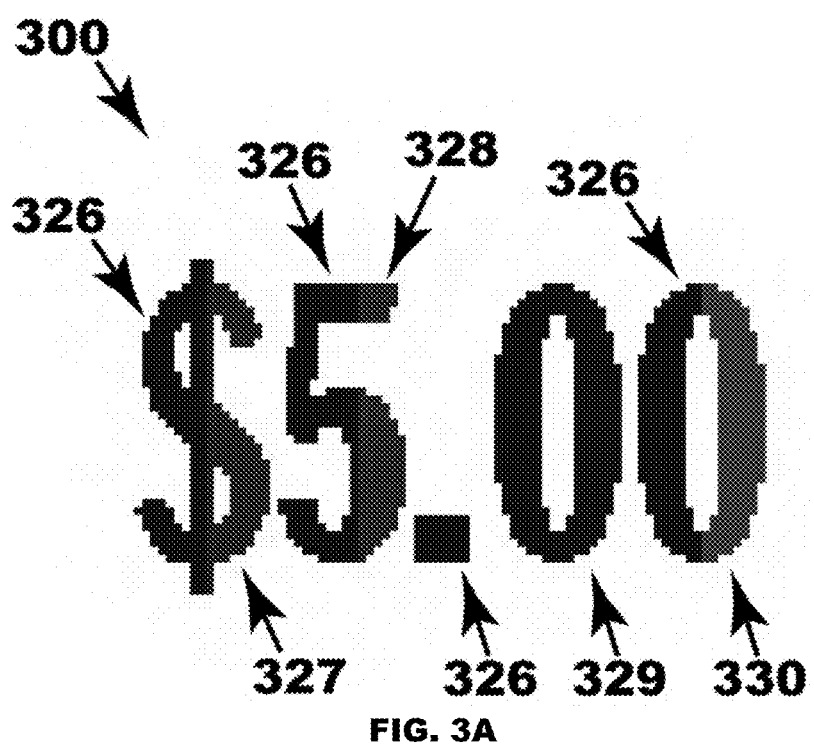
FIG. 3A is a front view of a first known representative example of modified lottery-type instant ticket indicia comprised of multiple (i.e., process color) ink applications of four different colors for redundancy.

For example, FIG. 3A depicts a representative example of a modified known lottery-type instant ticket indicum 300 comprised of multiple (e.g., four—CMYK) ink applications overlaying the same image thereby producing a redundant composite process color indicum. To better illustrate the concept of multi-application printing, redundancy indicum 300 includes four simulated color misprints—327 through 330. The correctly printed portions 326 illustrate how the indicum would appear with no misprints. The misprints illustrated in indicum 300 are: (1) the right half of the "$" symbol 327 missing the cyan ink application, (2) the right half of the "5" numeral 328 missing the magenta ink application, (3) the tens place "0" numeral 329 completely missing the yellow ink application, and (4) the right half of the units place "0" numeral 330 missing the black ink application. As is readily apparent in the redundant variable indicum 300 of FIG. 3A, the absence of any one of the CMYK process colors still leaves indicum 300 easily readable in its intended form. Arguably, it is somewhat difficult for one not skilled in the art to detect any failure of ink applications in indicum 300. Thus, the redundant printing of all of the CMYK colors alleviates any reasonable misinterpretation of the information conveyed by the variable indicum 300, namely a value of "$5.00."

Figure 1F:
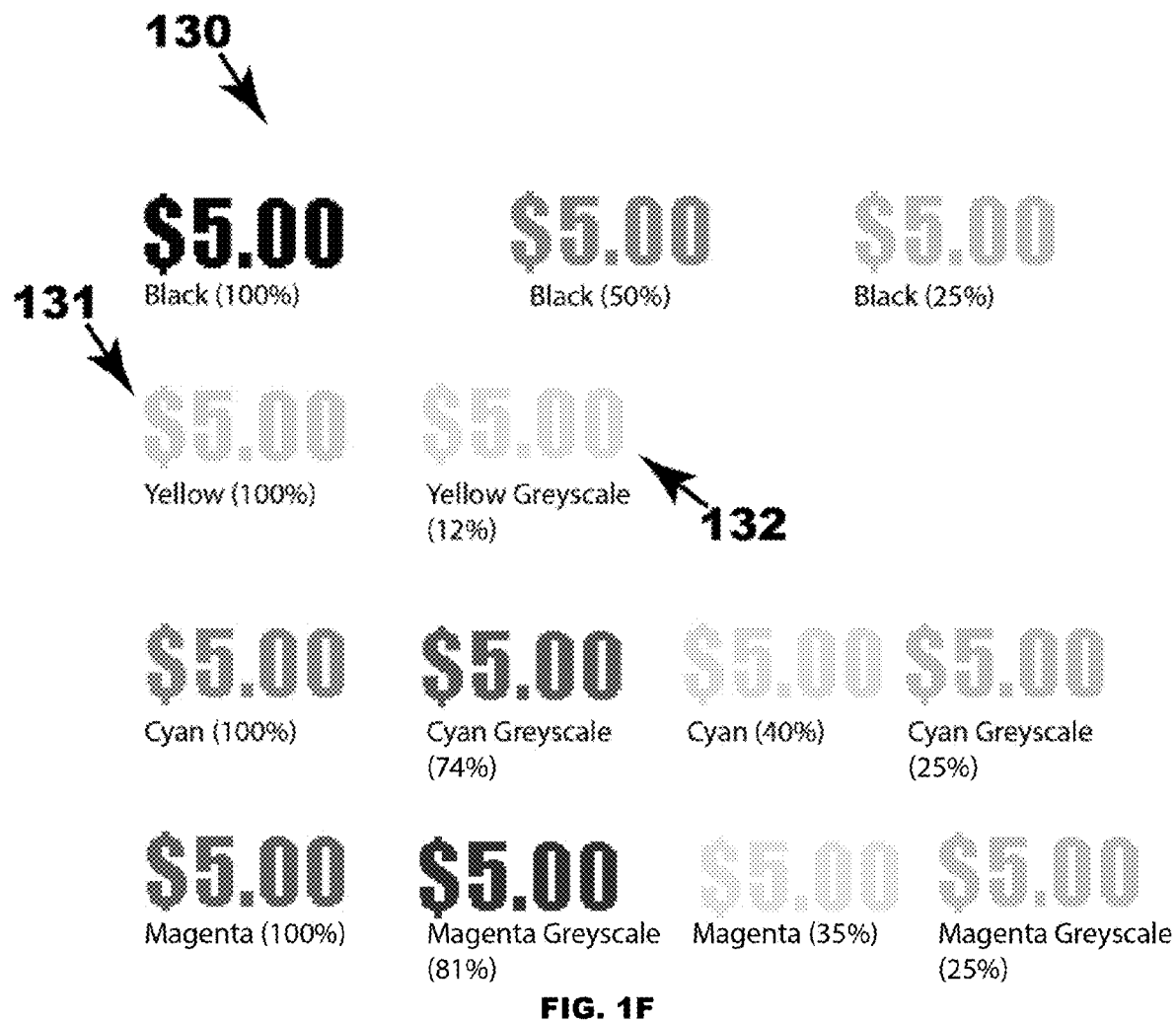
FIG. 1F is a front view of proposed indicia equating standard CYMK (i.e., Cyan, Magenta, Yellow, and blacK) component colors to their grayscale equivalents.

However, this known process achieve redundancy with at least two component colors printed with minimum theoretical gray scale levels (e.g., FIG. 1F, 130). While this methodology has the advantage of adding redundancy and consequently greatly reducing the printing error rate of indicia, it also has the disadvantage of possibly needlessly restricting the set of available redundant component colors (e.g., a 15% minimum gray scale threshold would result in zero redundant composite process colors comprised of two component colors where one of the two component colors was yellow, since an 100% application of yellow 131 only equates to a 12% grayscale 132 as shown in FIG. 1F). Additionally, since the component colors are selected by their grayscale equivalency that is a function of the component color printing density and not necessarily how the resulting printed indicum is perceived by the human eye, some component colors that may pass the theoretical redundancy criteria may pose legibility challenges for some observers under some circumstances and vice versa.

Thus, while this known method uses process colors to incorporating redundancy into indicia imaging, this known method defines component colors that can be redundant as having a grayscale threshold value above a theoretical minimum only in a subtractive color model. In other words, the grayscale threshold values are a function of the component color printing density and substance in a subtractive color model and not how the resulting printed indicia is perceived by the human eye—typically depicted by an additive color model. Therefore, since the purpose of redundant composite process color indicia is to convey redundancy information to human eye photoreceptors, the use of a subtractive color system for determining component color redundancy has the disadvantages of being non-optimal as well as needlessly restricting relative to human perception.

The present disclosure contemplates that these disadvantages can be mitigated or eliminated by qualifying component colors for composite process color indicia redundancy relative to their perception to human eye photoreceptor cones—in part by utilizing an additive color model. The additive color model as disclosed in the present application to an extent mimics the human eye's photoreceptor perception, thus ensuring that each selected redundant composite process color indicium's component color will reliably convey the indicium's intended information when viewed solely or as part of the composite process color indicum.

The present disclosure recognizes that ensuring the redundancy and reliability of SOC protected indicia across tens of billions of printed documents in an economically viable fashion requires synchronized multiple imaging of indicia in register in the same general predefined area such as by using process colors. Thus, redundancy is achieved by determining and confirming that at least two component colors comprising a combined composite process color indicium each retain sufficient legibility to convey the intended information of the composite process color indicium in the event of a failure of at least one component color or a portion thereof. By employing off-the-shelf process color digital imagers or printers to image or print composite process color indicia with at least two separate component color physical print heads printing the same indicium, production efficiencies with very high reliabilities can be realized. So long as at least two separate component colors are printed by physically separate print heads with each component color legible when viewed individually and as part of a composite process color indicum, redundancy is achieved. Therefore, the present disclosure contemplates that this redundancy disclosure determines or selects component colors that are readily observable to human eye photoreceptor cones when viewed individually and are portions of an overall redundant composite process color indicium. The human eye perspective is achieved by utilizing an additive color model that enables ready selection of qualifying redundant component colors used to create composite process color indicia.

With various additive color model emulating human eye photoreceptor perception it is necessary to establish the color temperature of the light illuminating the process color indicia. As previously described, the two exemplary illustrations 200 of FIG. 2A assume the light sources 201 and 204 are emitting white light (e.g., at 3,200° K). If the light sources 201 and 204 were instead emitting mostly red light (e.g., at 1,850° K) the red surface 202 would still appear red because red light 203 would still be reflected from it; however, the green surface 205 would appear black or dark gray because little or no green light 206 would be reflected, since green light was not present in the light source 204. In other words, since the perceived color of an indicium is a function of the illuminating light source, the perceived color will vary depending on the color temperature of the light—e.g., in the previous example, a red indicium would still appear red, but a green indicium might appear black under the same illumination. While there are a large quantity of possible color temperatures for illuminating light that can realistically occur when humans are viewing printed process color indicia (e.g., candle light, low bar lighting, fluorescence light, sunlight), it is impractical to attempt to model all possible illuminating light color temperatures; thus, when qualifying the redundancy of component color indicia, it is advantageous to assume the indicia will be observed in studio quality white light—i.e., 3,200° K. The 3,200° K color temperature displaying the "true" or (more to the point) the intended color of the indicia and arguably being the color temperature of the illuminating light that would be used to verify any apparent winning tickets or documents. The commercial standard Adobe Photoshop RGB, 8-bit color profile (effectively replicating 3,200° K illumination) is one profile additive color model embodiment for the present disclosure. Other profiles (e.g., Apple RGB) can under some circumstances be more desirable to employ.

Thus, by analyzing each component color's qualification for legibility and consequently redundancy with reference to an additive color model (i.e., RGB) emulating human eye photoreceptors under a given quality of illumination (e.g., 3,200° K) instead of the component color's qualification for legibility and redundancy utilizing a subtractive color model (i.e., CMYK) in grey scale, the systems and methods of the present disclosure provide significant gains in the scope and quality of component color selection can be realized. While the selection of an additive color model for determining indicia component color redundancy may seem counterintuitive, composite process colors are typically comprised of at least the primary subtractive colors Cyan, Magenta, and Yellow (CMY)—i.e., the same colors that define subtractive color models. In other words, when formulating any composite process color, a subtractive color model must be employed. Though, while this is true for composite process color formulation, when attempting to determine the legibility of any component color or resulting process color to the human eye it is necessary to consider the transmitted wavelengths of light rather than the pigments themselves, therefore measuring component colors and/or composite process colors with an additive color model at a standard theoretical color temperature.

While there are numerous commercial off-the-shelf additive color models available (e.g., Apple RGB; Adobe RGB; Digital Camera Initiative Publication 3 or "DCI-P3"; Standard RGB or "sRGB"), the standard Adobe RGB model operating in 8-bit can be employed for performing part of the analysis of component and composite process color redundancy. The Adobe RGB model provides universal applicability to most if not all computing and printing platforms as well as its seamless integration with Adobe Photoshop 5 CMYK subtractive color model, which is the generally accepted subtractive model for process colors in the printing industry.

Figure 5A:
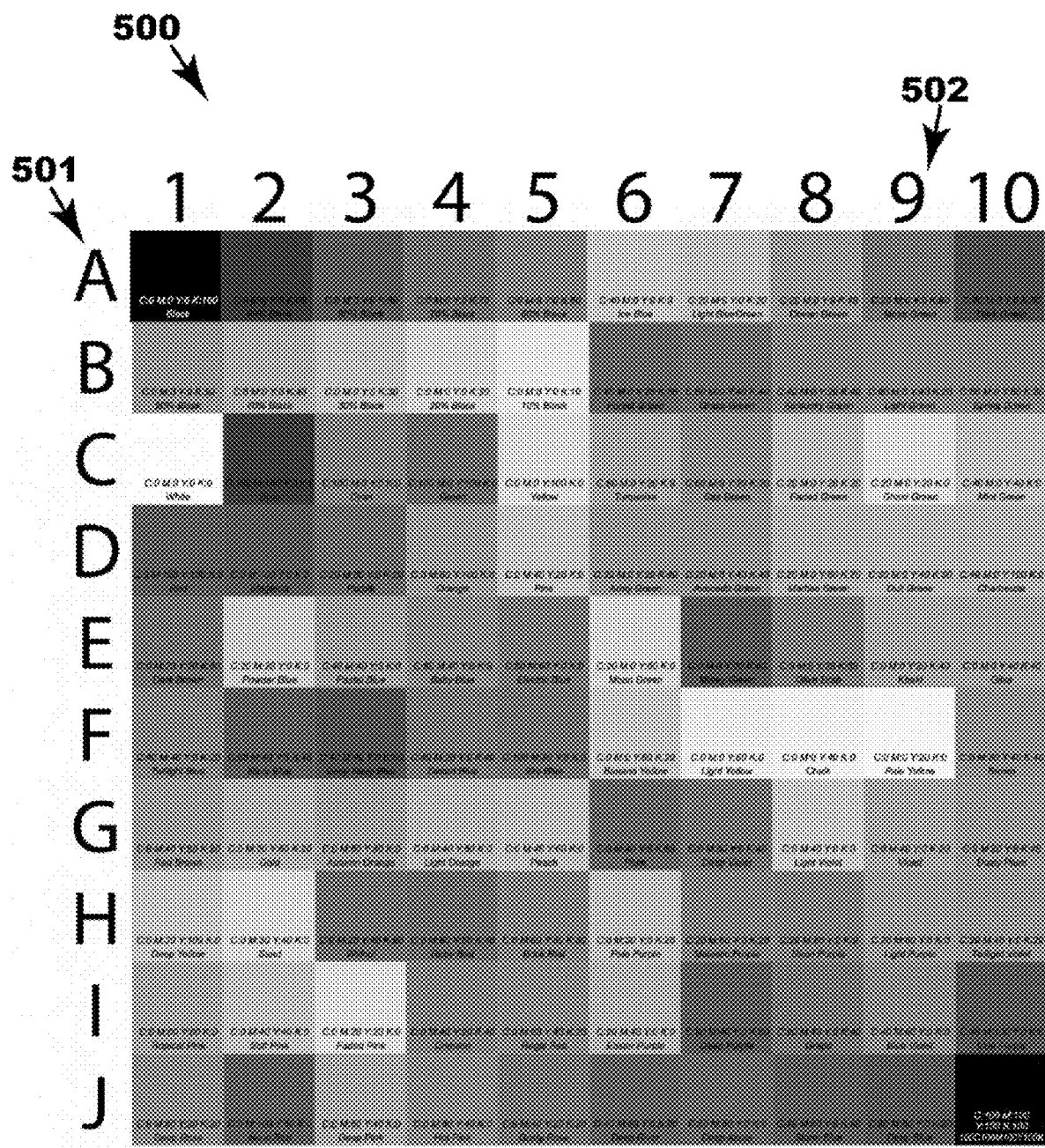
FIG. 5A is a front view of a representative example of a known matrix of process colors, each color comprised of at least one component of CMYK.
Figure 5B:
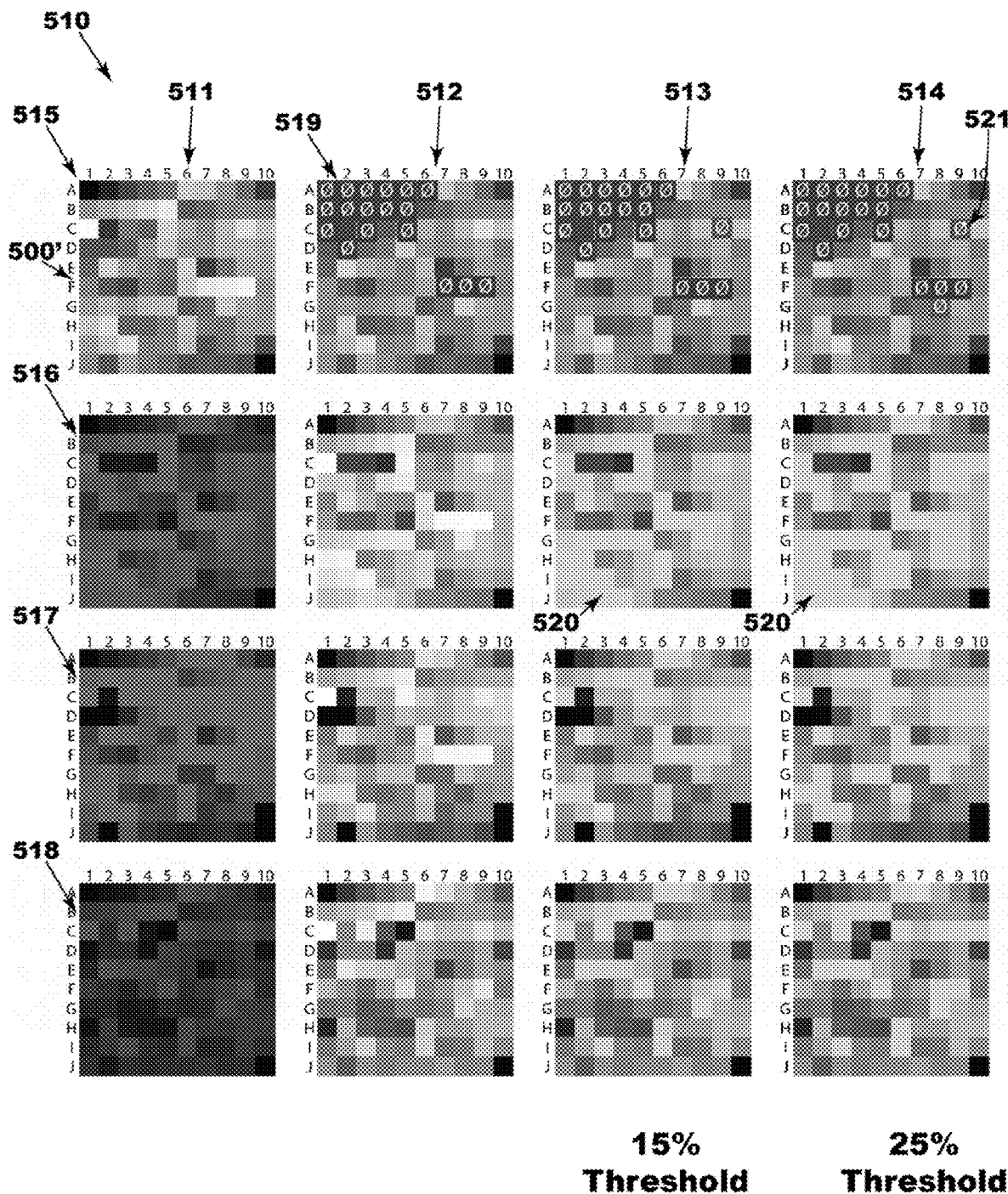
FIG. 5B is a front view of the representative example matrix of process colors of FIG. 5A as perceived by an additive color model with some non-redundant colors highlighted.

By evaluating each component and composite process color with the Adobe RGB (8-bit) additive model, each candidate color can be viewed in red, green, and blue channels separately; thereby, enabling color metrics and associated analysis that more closely model the red, green, and blue photoreceptor cones of the human eye—see FIG. 2B. For example, FIG. 5A provides a front elevation view of a known representative example of a 10×10 matrix 500 of one hundred process color cells with each color comprised of at least one component of CMYK. This same matrix 500 is shown in the FIG. 5B illustration 510; however, 510 of FIG. 5B also illustrates the same matrix as it would be approximately observed by human eye red 516, green 517, and blue 518 cone photoreceptors rows—i.e., with human color photoreception, the three RGB cone inputs 225, 224, and 223 (FIG. 2B) are transmitted to and combined in the brain to produce our standard color perception 515 (FIG. 5B).

Thus, by the system and method analyzing component and composite process colors with an additive (i.e., RGB) color model, greater understanding can be realized of how a color is perceived by a human and more to the point how likely a particular color is to appear legible to a human when utilized for variable indicia redundancy. Nevertheless, it should be noted that while standard RGB additive color models (e.g., Adobe RGB) accurately reflect the red, green, and blue reflected light components of a particular color with a given color temperature illumination, these same additive models do not typically emulate the biasing that the human eye inherently has when perceiving RGB light. This is because standard RGB additive color models are configured to emulate the reflected light emitted from a real world object under a given color temperature illumination such that a computer monitor, television, or movie screen can accurately reproduce the same type of light for human perception. However, this is not the same as an additive color model seeking to emulate human color perception. While this difference between "emission" and "perception" may appear to be trivial or confusing, it is important when establishing a standard for machine metric indicia component and composite process color redundancy that is derived independent of a "qualified" human simply looking at a given color and determining whether or not it is acceptable for indicia redundancy.

As previously explained, human eye photoreceptors are divided into three different types of color sensitive cones—i.e., long wavelength "red" cones, medium wavelength "green" cones, and short wavelength "blue" cones (see 225, 224, and 223 of FIG. 2B). As apparent from graph 220, each of the three cone's sensitivity is an approximate Gaussian distribution with averages centered about three different wavelengths with significant overlap, particularly the "green" 224 and "red" 225 cones. In addition to asymmetrical overlapping of cone sensitivity curves, the quantity of each type of cone present in the eye is unevenly balanced. About 64% of the cones respond most strongly to red light, while about 34% respond mostly to green light with only 2% of the cones responding strongest to blue light. Additionally, the lens and cornea of the eye tend to block shorter wavelengths, thereby further reducing sensitivity to blue and violet light. Accordingly, some colors are perceived by a human observer with greater luminescence intensity than other colors. Blue, green, and red colors are more intense (assuming the same number of photons are exciting the cones in each case) if the photons' excitation wavelength are near the Gaussian distribution centered averages—i.e., "blue" 223 at 445 nm, "green" 224 at 535 nm, and "red" 225 at 575 nm. Additionally, most colors are wavelengths of light that are received by more than one type of cone with the color yellow received by both the "green" 224 and "red" 225 cones since yellow light wavelength (i.e., 570 to 580 nm) is near both cones' peak sensitivity resulting in the color yellow as the second highest level of excitation the human eye can experience (white being the highest).

When taking these color asymmetries into consideration, an approximation of the human eye's disproportionate sensitivity to the different visible color wavelengths is provided in graph 230 of FIG. 2C. With graph 230, the combined overlap between the "green" 224 and "red" 225 cones (FIG. 2B), combined with the disproportioned quantity of each type of cone present in the eye, also shared with the eye's lens and cornea tending to block shorter wavelengths results in a Gaussian sensitivity distribution of the human perception with the color yellow 235 (FIG. 2C) being observed as the most intense, then the color green 234 second intense, the standard color red 236 third intense, and the standard color blue 233 fourth intense. This type of asymmetrical color luminescence intensity modeling is typically not conveyed in the standard "emission" additive color models commercially available, because the design goal with these types of models is to accurately project light to the human eye, not convey how those projected colors are perceived by a human within a machine's memory.

As before, this distinction between standard "emission" additive color models commercially available and the internal "perception" of a human to color may seem trivial or may appear to be confusing, but if the goal is to qualify component or composite process colors for indicia redundancy using defined metrics and processes, it is desirable for the additive color model employed to be tuned such that it more closely resembles human "perception" than the "emission" of light reaching a human's eye. By selectively limiting the range of some RGB channels from the lower (i.e., darker) portion of the selectively limited channel color's gamut, an additive color model can be derived that reasonably emulates human color perception. Thus, with this selective tuning an additive color model more closely resembling human "perception" can be employed to automatically and consistently analyze candidate redundant component and composite process colors for redundancy suitability independent of human operator input.

More specifically, for example, in one embodiment of the present disclosure the Adobe RGB (8-bit) additive color model channels are selectively tuned such that the green channel remains unaltered, the red channel's lower (darker) end gamut is reduced by 3%, and the blue channel's lower (darker) end gamut is reduced by 7%. In an alternative embodiment, the standard relative luminance conversion by multiplying: the red channel output by the coefficient "0.2126", the green channel output by the coefficient "0.7152", and the blue channel output by the coefficient "0.0722". Other embodiments of the present disclosure contemplate emulating the human eye's color perception gamut where green light contributes the most to the intensity perceived by humans and blue the least are possible.

Whichever tuning model is employed, this selective channel tuning of the additive color model simulates human visual perception by: mimicking the wavelengths of light received by each of the three types of cone photoreceptor in the human eye, allowing for the percentage of each type of cone present in the human eye, simulating the proportioned overlap between each type of cone's optical bandwidth, etc. any suitable selective tuned additive color model developed for indicia redundancy results should at least initially be reviewed and audited to confirm that the model is in fact accurately reflecting human color "perception"—the goal being to provide a reliable, repeatable, and auditable additive color model that can be universally employed to ensure indicia redundancy. There are other methods of tuning existing RGB additive color models that can be employed under some circumstances. For example, a given pixel's luminescence intensity values from at least two different channels (e.g., red and green) can be summed and transposed into a new fourth (summation) channel that can be weighed against standard RGB values, individual color channel gamut range can be reduced by deletion of Least Significant Bits (LSB), etc.

Regardless of the additive RGB color model utilized to simulate human color perception, once a given component or composite process color has been broken down by the chosen additive color model to its discrete digital RGB channel values, further processing is required to provide a metric for determining whether the given component or composite process color is acceptable for redundant indicia utilization. In certain embodiments, each RGB model channel is converted to its grayscale equivalent in which the value of each pixel is a single sample carrying only luminescence intensity information with the sum of all pixels contained in the color sample image's field of view comprising the data that is evaluated for each channel. Assuming the field of view exclusively contains a homogeneous distribution of only the component or composite process color being evaluated, a relative analytic can be determined that can effectively provide a minimum threshold of legibility of each component or composite process color's suitability for indicia redundancy. With these particular embodiments, the grayscale equivalent values of all the pixels in the field of view are mean averaged with the resulting metric compared to a theoretical minimum threshold value (e.g., ≥15%) where if the mean averaged metric is less than the theoretical minimum threshold value the tested color is deemed insufficient for redundancy, and conversely if the mean averaged metric is greater than or equal to the theoretical minimum threshold value then the tested color is deemed to be acceptable for use with indicia redundancy. There are other methods for determining a relative analytic metric qualification for indicia redundancy (e.g., modal average, median average, Kalman filter for noisy images prior to averaging) that may under some circumstances be more desirable in accordance with the present disclosure.

While there are multiple methods to provide a metric for gray scale equivalence, when determining a relative analytic metric qualification for indicia redundancy for a component or composite color's contribution to a redundant composite indicium process color, the printing convention of employing percentages (i.e., a scale of 0% to 100% line screen) can be employed. While the percentage range of this methodology encompasses a total of only one hundred and one intensities, the range is nevertheless sufficient to reliably identify thresholds for minimum legibility of each contribution component color for most circumstances. Also, the intuitive nature of percentile notation is commonly used in printing to denote how much ink is employed in halftoning and is thereby a familiar standard for most printers. It should also be noted that the common printing percentile notation approach scale is reversed to most other systems of grayscale measurement, in that a value of 0% denotes white and a value of 100% total black (saturation). There are other methods of grayscale numerical representation (e.g., rational numbers, binary quantized values) that may be more desirable in some circumstances in accordance with the present disclosure.

Various embodiments include printing percentile notation to determine minimum thresholds of redundancy, to ensure redundancy, two or more component colors can be combined in such a way that should a portion of any component color fail to print the remaining color(s) need to contribute or combine to exhibit a minimum of 15% (for a white substrate background) or 25% (for a dull or colored substrate background) grayscale equivalent over the entire process color indicium when viewed in at least one of the additive color channels (i.e., red, green, or blue). These theoretical threshold values should be viewed as extremely conservative to ensure variable indicia legibility under non-optimal conditions (e.g., low lighting, direct sunlight, poor printing substrate). Different theoretical threshold values are possible and desirable under different circumstances—e.g., 11% (typical white background, typical lighting) or 18% (typical dull or colored background, typical lighting) grayscale equivalent.

Finally, the pass (logic "1") or fail (logic "0") results from the theoretical threshold tests for each of the three channels (i.e., RGB), are logic inclusive-OR together resulting in any one or more of the RGB color channels passing the theoretical threshold tests qualifying the component or composite process color as redundant. The logic inclusive-OR of any passing test result effectively emulating the human eye's perception, since indicium legibility with any one type of color cone photoreceptor would mean the indicium would be legible to a human.

In the above disclosure, it should be appreciated that variable indicia theoretical threshold values vary depending on the background behind the variable indicia. This is because human visual perception is more sensitive to contrast than absolute luminance—e.g., humans can perceive the world similarly regardless of the huge changes in illumination over a day or from place to place. With human visual perception, contrast is determined by the difference in the color and brightness of the object and other objects within the same field of view. When determining metrics for variable indicia component or composite color redundancy, the significance contrast is the contrast ratio between the printed variable indicia and its associated background.

Figure 3B:
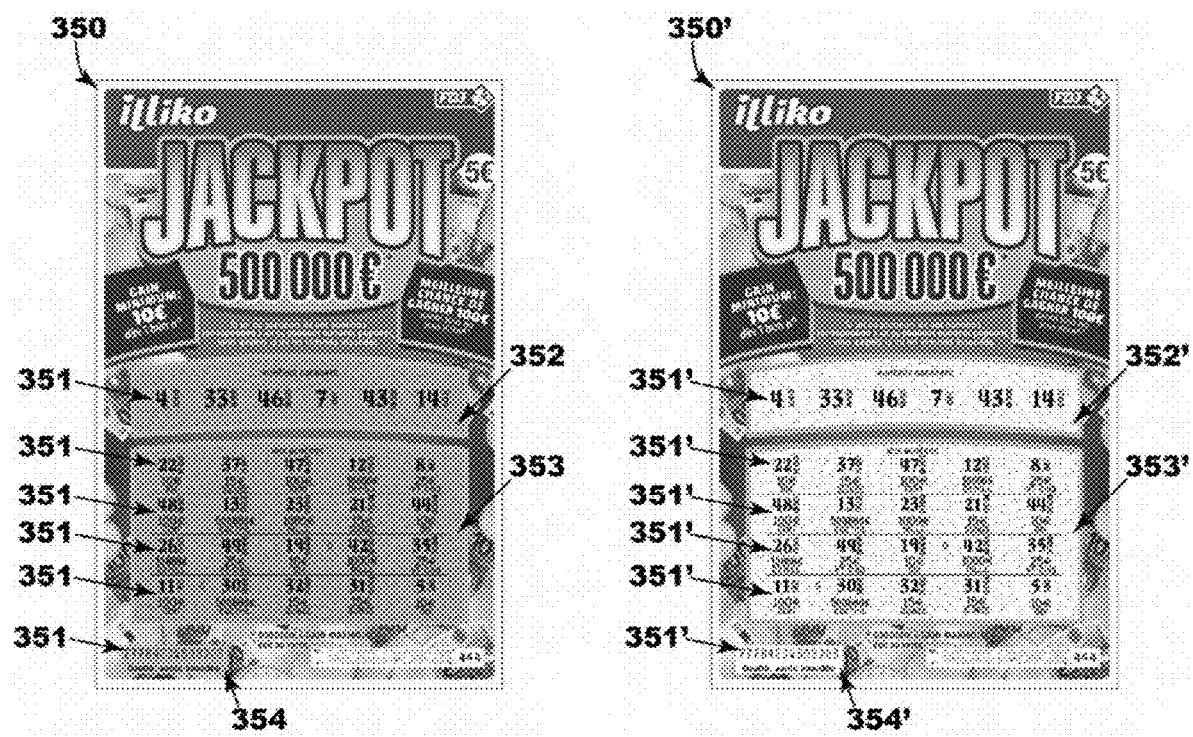
FIG. 3B is a front view of representative examples of known lottery-type instant ticket indicia imaged on typical low and high contrast backgrounds.

For example, FIG. 3B provides two images (350 and 350') of the same lottery-style SOC secured instant ticket differing only with low contrast 350 and high contrast 350' backgrounds in the general area of the variable indicia (351 and 351'). Low contrast image 350 is illustrated with a plurality of printed variable indicia 351 printed on top of a dark or gray background (352, 353, and 354). Most traditional lottery-style SOC secured instant tickets feature this type of low contrast background (352, 353, and 354) since the tickets are printed on paper with lower security ink films layers printed under the variable indicia typically exhibiting a low contrast background due to an opacity ink film layer comprised predominately of carbon—i.e., it is difficult to print a smooth high contrast covering ink film layer over a carbon black ink film layer. Recently, various technology advancements have enabled variable indicia imaging on a high contrast (e.g., white) background. Additionally, known lottery-style SOC secured instant tickets using a foil substrate also provide a high contrast background for variable indicia. Whichever technology is employed, high contrast lottery-style SOC secured instant tickets similar to image 350' are possible with variable indicia 351' printed on high contrast smooth backgrounds (352', 353', and 354'). In the example images 350 and 350' of FIG. 3B, the black monochromatic variable indicia (351 and 351') is clearly legible on both tickets, however it is nevertheless also readily apparent that with the higher contrast background 352', 353', and 354' the variable indicia 351' appears sharper and more well defined. When process colors are employed to image variable indicia this sharper and more defined difference is even more pronounced.

Accordingly, variable indicia theoretical threshold values can vary depending on the background behind the variable indicia in accordance with the present disclosure. The goal being to ensure that a sufficient Signal-to-Noise ratio ("S/N") is maintained between the variable indicia intended information (signal) and the background behind the variable indicia (noise). For determining a variable indicia signal to background noise "$S_i/N_b$", one possible method would be to directly apply "Weber's Fraction" (known in the art as a means of determining visual contrast where small features are present on a large uniform background) as described by the following equation:

$$S_i/N_b = \frac{I - I_b}{I_b}$$

Where: I=the luminescence of the variable indicia
$I_b$=the luminescence of the background However, there are several problems with directly adapting "Weber's Fraction" to an additive RGB color model for determining human legibility of indicium relative to background substrate noise. First, "Weber's Fraction" is intended to determine contrast for units of luminescence, not in the preferred units of 0% to 100% line screen gray scale. Secondly, a direct application of "Weber's Fraction" would essentially compare a single pixel on the indicium to a single pixel in the background, while this would be acceptable with homogeneous color indicium and backgrounds it would not provide acceptable metrics for heterogeneous indicia and/or backgrounds.

Figure 3C:
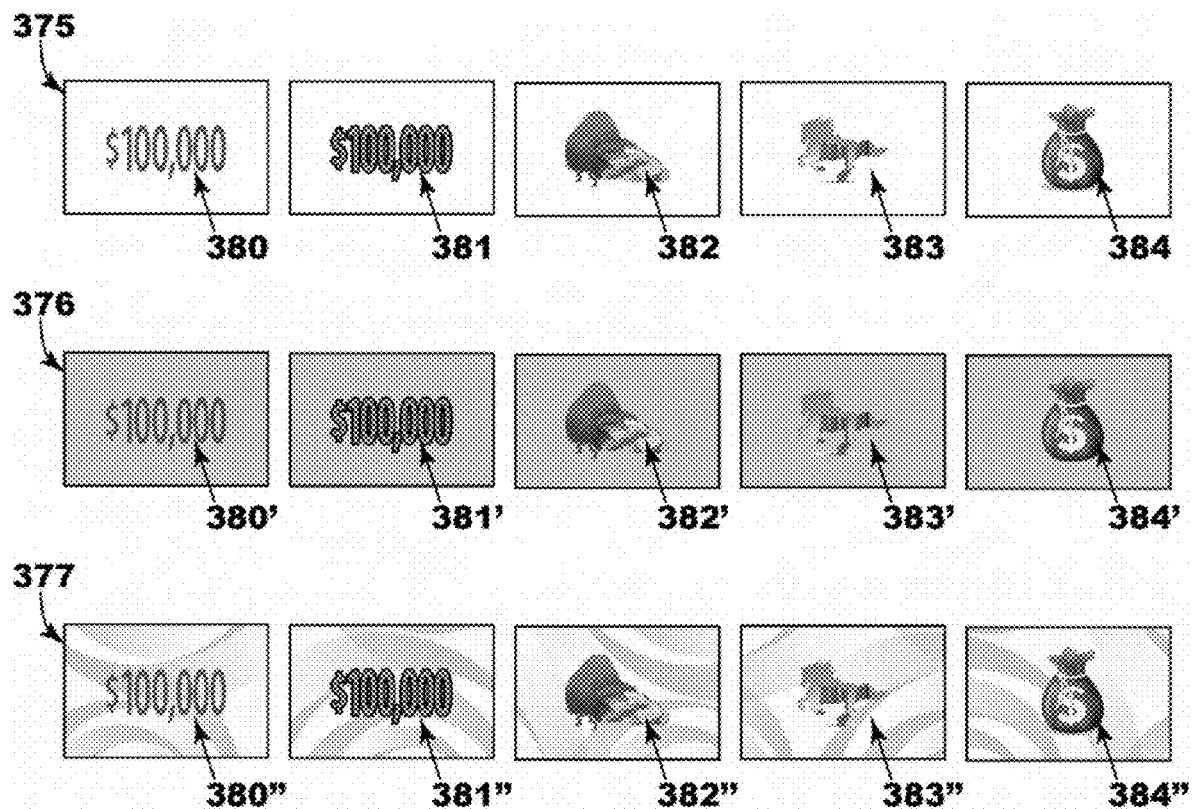
FIG. 3C is a front view of representative examples of known lottery-type instant ticket indicia imaged on low, high, and variable contrast backgrounds.

For example, FIG. 3C illustrates five different variable indicia (380/381'/381" thru 384/384'/384") imaged on three different backgrounds (375 thru 377). As is apparent in FIG. 3C, the three different types of backgrounds are arranged as rows with row 375 displaying an exemplary homogeneous high contrast white background, row 376 displaying an exemplary homogeneous low contrast gray background, and row 377 displaying an exemplary heterogeneous variable background. The five different exemplary types of variable indicia are arranged in columns with column indicated by 380, 380', and 380" displaying a color homogeneous indicium, column indicated by 381, 381', and 381" displaying a slightly (i.e., black boarder) heterogeneous indicium, and the other three columns respectively indicated by 382 thru 382", 383 thru 383", and 384 thru 384" displaying varying degrees of heterogeneous indicium. Thus, in the example of FIG. 3C, "Weber's Fraction" would only yield theoretical usable $S_i/N_b$ results for indicium 380 and 380' on background rows 375 and 376—i.e., all other indicium would potentially yield erroneous results as would background row 377.

Though, by modifying "Weber's Fraction" equation to allow for variances in both the variable indicium and associated background, usable $S_i/N_b$ results may be obtained. This "Modified Weber's Fraction" equation produces usable $S_i/N_b$ results for both homogeneous and heterogeneous variable indicium as well as associated background using the percentage units of 0% to 100% line screen gray scale is provided below:

$$S_i/N_b = \frac{\mu_i - (\mu_b + \sigma_b)}{(\mu_b + \sigma_b)}$$

Where: $\mu_i$=is the mean average of the variable indicium in units of modified gray scale
$\mu_b$=is the mean average of the background in units of modified gray scale
$\sigma_b$=one standard deviation of the background in units of modified gray scale In the above Modified Weber's Fraction equation variable definition the term "in units of modified gray scale" repeatedly appears. In the context of this disclosure, the term "modified gray scale" means that the standard gray scale of 0% to 100% line screen is concatenated to effectively eliminate 0%—i.e., 0% thru 1% are equated to 1% for the purpose of this preferred Modified Weber's Fraction $S_i/N_b$ equation. This modification was necessary to eliminate the possibility of dividing by zero (i.e., perfectly white substrate) in the Modified Weber's Fraction $S_i/N_b$ equation at the cost of losing approximately 0.99% fidelity. It should be also noted, that the reason for the asymmetry in the numerator of the Modified Weber's Fraction $S_i/N_b$ equation (i.e., the variable indicium value is only derived from its mean average "$\mu_i$" in gray scale, whereas the background value is derived from the sum of its gray scale mean average "$\mu_b$" and one standard deviation "$\sigma_b$") is because the variable indicium is typically evaluated with each of its component colors separately, thereby normally resulting in less variance, while some backgrounds can vary significantly (e.g., rows 376 and 377 of FIG. 3C) with the added one standard deviation accounting for this variance in backgrounds. This is true, even though variable indicium component colors may vary in line screen over the same component color application (e.g., variable indicium 383); however, it has been found that any variable indicium line screen variance of a component color does not significantly deviate from its mean average.

Figure 3D:
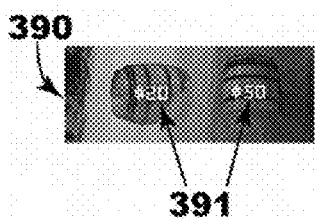
FIG. 3D is a front view of a representative example of known lottery-type instant ticket indicia created by knocking out the variable indicia from a continuous imaged background.

However, there remains the special case of the variable indicia being defined by the absence of imager ink where the actual indicium is created by "knocking out" (removing ink from an area) a portion of a continuous imaged background in the shape of the desired variable indicium—e.g., the continuous imaged background 390 and knocked out variable indicia of FIG. 3D. The $S_i/N_b$ for this special case may still be calculated using the Modified Weber's Fraction $S_i/N_b$ equation by simply reversing the variable indicia and background variables—e.g., the printed portion of the variable indicia 391 of FIG. 3D would assume the variables "µb" and "$\sigma_b$" with the continuous imaged background 390 assuming the variable "$\mu_i$" in the Modified Weber's Fraction $S_i/N_b$ equation.

Thus, the above disclosure of the Modified Weber's Fraction $S_i/N_b$ equation enables a metric to be calculated from applying grayscale measurements of a variable indicium and associated background to determine the signal-to-noise level existing between the variable indicium and the background. However, the Modified Weber's Fraction $S_i/N_b$ equation does not specify the minimum acceptable $S_i/N_b$ value required to ensure legibility of a given variable indicium component color over a given background. Once the Modified Weber's Fraction $S_i/N_b$ equation's results are applied to a variety of variable indicium component colors and associated backgrounds, it appears that a $S_i/N_b$ of at least "3.7" would produce reliable legible indicium. While this is less than the generally accepted "Rose criterion" level of a minimum S/N of "5" needed to be able to distinguish image features with certainty, the reduced legibility threshold for the Modified Weber's Fraction $S_i/N_b$ equation can be attributed to different criteria measured ("Rose criterion" typically utilizes lumens), a reduced scale of one hundred possible levels, and clearer demarcation between variable indicia and associated background.

Figure 4A:
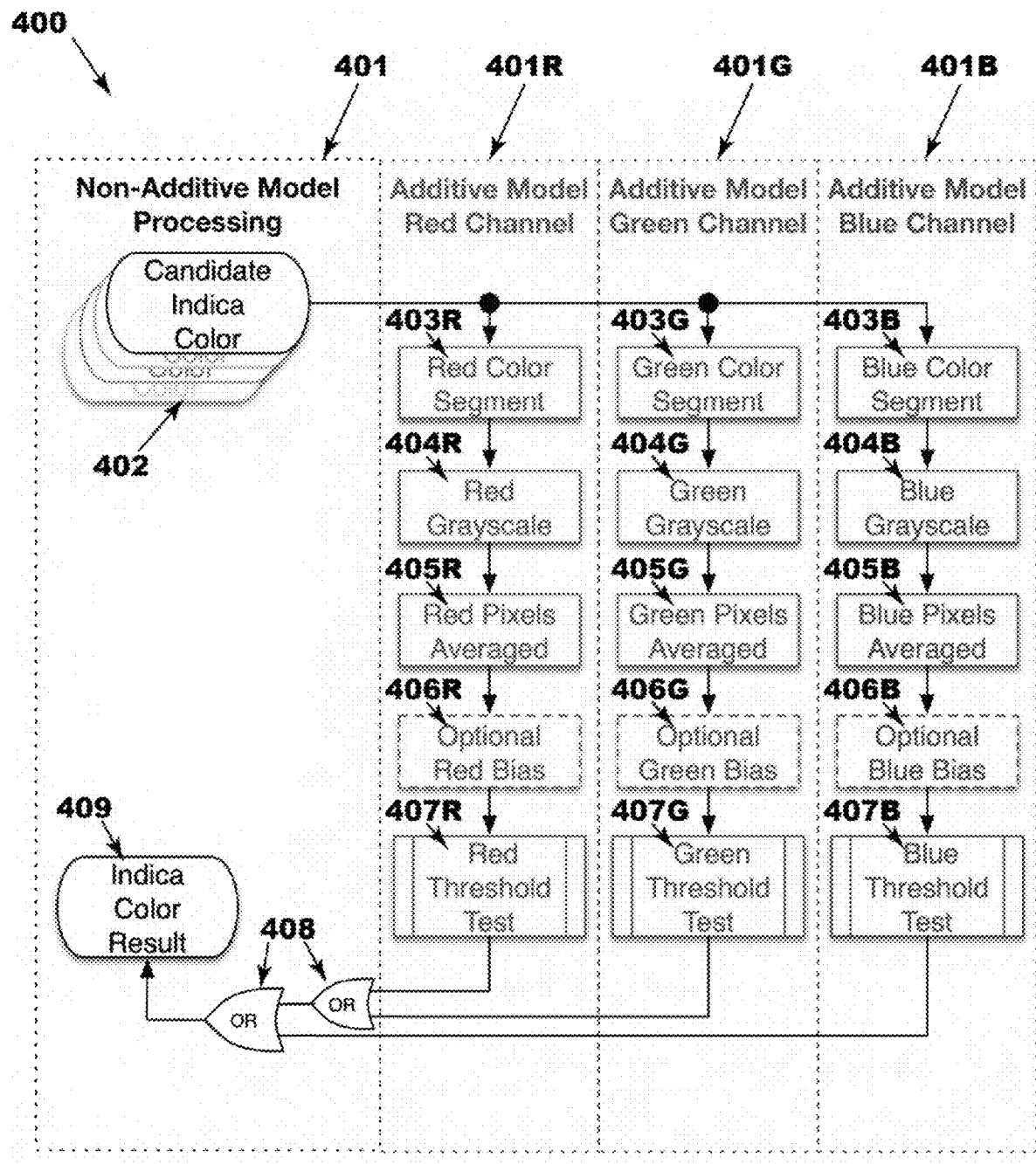
FIG. 4A is a multichannel flowchart providing a schematic graphical overview of one example embodiment of the present disclosure for determining a component or composite process color's qualification for indicia redundancy prior to the production process.
Figure 4B:
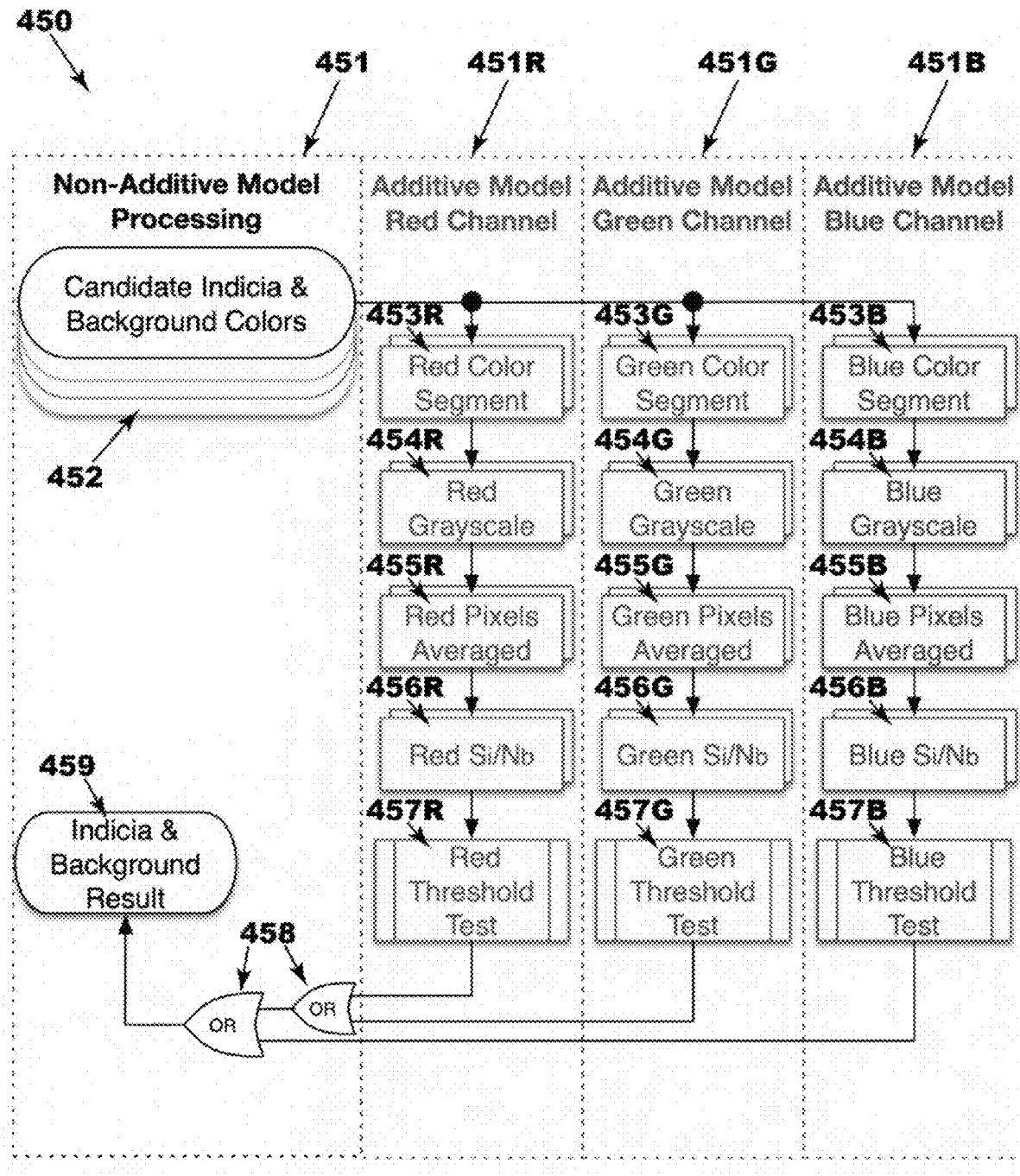
FIG. 4B is a multichannel flowchart providing a schematic graphical overview of an alternative example embodiment of the present disclosure for determining a component or composite process color's qualification for indicia redundancy relative to its background prior to the production process.
Figure 4C:
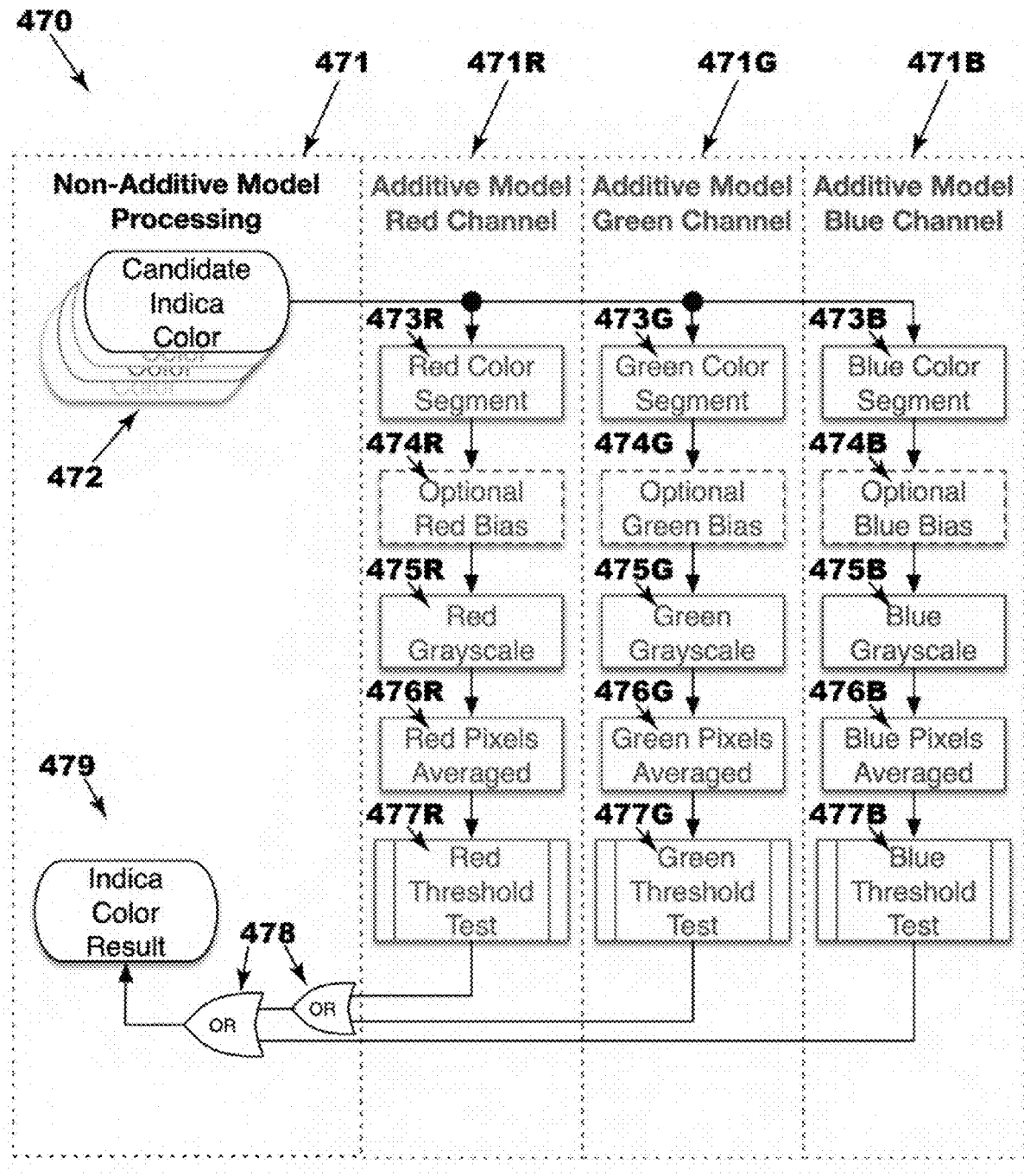
FIG. 4C is a multichannel flowchart providing a schematic graphical overview of another example embodiment of the present disclosure for determining a component or composite process color's qualification for indicia redundancy prior to the production process.

FIGS. 4A, 4B, and 4C illustrate different embodiments of the previously explained additive model luminescence intensity testing for certain indicia redundancy embodiments as multichannel flow charts 400, 450, and 470 in accordance with the present disclosure. As illustrated in the multichannel flowcharts 400 and 470, these example embodiments of the present disclosure are conceptually divided into four groups (i.e., "Non-Additive Model Processing" 401 and 471, "Additive Model Red Channel" 401R and 471R, "Additive Model Green Channel" 401G and 471G, and "Additive Model Blue Channel" 401B and 471B) by the four "multichannel" columns as shown in FIGS. 4A and 4C. For these example embodiments, a particular flowchart function appears completely within a channel, its functionality is limited to the data category of the associated channel. For example, Red Grayscale 404R is exclusively processed in the Additive Model Red Channel column 401R. It should be appreciated that these functions shown in these flowcharts and described below would be performed by various embodiments of the systems of the present disclosure.

The FIG. 4A multichannel flowchart 400 begins with the candidate component or composite process indicia color 402 submitted in a digitally suitable image format with its field of view comprised (at least primarily) of the candidate indicia color 402. Optionally, if the candidate indicia color 402 is a composite process color, its additive primary component colors (e.g., cyan, magenta, yellow, and/or black) should each be tested individually for indicia redundancy.

This candidate indicium color 402 image is then broken down by the chosen additive model into red 403R, green 403G, and blue 403B segments with each segment emulating the luminescent intensity as perceived by the human eye "red", "green", and "blue" cone photoreceptors respectively. Once the complete "white light" or "full color" image 402 has been broken down into its red 403R, green 403G, and blue 403B segments, each segment is then converted to grayscale 404R, 404G, and 404B such that value of each grayscale pixel conveys a metric representing the intensity of that pixel for its respective color channel. Next, the intensity values of all the pixels in the field of view are averaged for each color channel or segment (405R, 405G, and 405B) thereby providing a single averaged metric for each discrete color channel. At this point, optional biases can be applied to any or all of the three color channels' derived metrics (406R, 406G, and 406B), thereby "tuning" the additive color model to more accurately reflect the perception of human eye photoreceptor cones.

The next step is to perform a threshold test (407R, 407G, and 407B) on each of the three derived color channel metrics, where each metric is compared to a theoretical threshold value (i.e., greater than or equal to x) to determine a pass (logic "$1_2$") or fail (logic "$0_2$") test result of the candidate color for indicium redundancy, relative to each color channel. The three binary indicium redundancy test results (407R, 407G, and 407B) are then Boolean logic inclusive-OR together 408 with any one single resulting passing output bit determining if the candidate color is suitable for indicia redundancy 409.

In an alternative embodiment indicated by numeral 470 of FIG. 4C, optional biases can be applied in alternately or addition, after the segmentation (473R, 473G, and 473B) process, thereby employing the "tuning" process with a larger set of data (e.g., 8-, 16-, 24-, 30-, 36-, or 48-bit color). In the alternative embodiment indicated by numeral 470, the process logic flow is similar to what has already been disclosed in FIG. 4A starting with the candidate component or composite process indicia color 472 (FIG. 4C) submitted in a digitally suitable image format with its field of view comprised mainly of the candidate indicium composite or component color 472.

As before, this candidate indicium color 472 image is then broken down by the chosen additive model into red 473R, green 473G, and blue 473B segments with each segment emulating the luminescent intensity as perceived by the human eye "red", "green", and "blue" cone photoreceptors respectively. Once the complete "white light" or "full color" image 472 has been broken down into its red 473R, green 473G, and blue 473B segments, optional biases can be applied (e.g., multiplying the red channel's intensities by the coefficient "0.2126", multiplying the green channel's intensities by the coefficient "0.7152", and multiplying the blue channel's intensities by the coefficient "0.0722" as previously discussed) to any or all of the three color channels' derived metrics (474R, 474G, and 474B), thereby "tuning" the additive color model to more accurately reflect the perception of human eye photoreceptor cones. At this point, each segment is then converted to grayscale 475R, 754G, and 475B such that value of each grayscale pixel conveys a metric representing the intensity of that pixel for its respective color channel. Next, the gray scale intensity values of all the pixels in the field of view are averaged for each color channel or segment (476R, 476G, and 476B) thereby providing a single averaged metric for each discrete color channel.

The next step is to perform a threshold test (477R, 477G, and 477B) on each of the three derived color channel metrics, where each metric is compared to an i theoretical threshold value (i.e., greater than or equal to x) to determine a pass (logic "1") or fail (logic "0") test result of the candidate color for indicia redundancy, relative to each color channel. The three binary indicia redundancy test results (477R, 477G, and 477B) are then Boolean logic inclusive-OR together 478 with any one resulting passing output bit determining if the candidate color is suitable for indicium redundancy 479.

In addition to luminescence intensity testing to determine a candidate component or composite process color's qualification for indicia redundancy, the contrast between a candidate component or composite process color and its background or nearby surroundings can also be used as a metric to qualify component or composite process colors for indicia redundancy. Dr. Simon Laughlin's 1981 seminal paper "*A simple coding procedure enhances a neuron's information capacity*" (Department of Neurobiology, Research School of Biological Sciences, P. O. Box 475, Canberra City, A. C. T. 2601, Australia) demonstrates that all organisms with eyes are more interested in differences in luminescence, or contrast, than in luminescence per se. For this reason, the neurons which receive outputs from photoreceptors tend to respond to contrast rather than luminescence.

Thus, the previously disclosed luminescence intensity testing embodiment can be further expanded to provide an empirical contrast metric for indicia redundancy between candidate component or composite process colors and their background or surrounding area colors. With this specific contrast embodiment, the same processes for measuring grayscale with an additive RGB color model can be utilized to provide contrast metrics for the candidate component or composite process color relative to its background or surrounding area color(s). In this example contrast embodiment, the candidate indicium color and the background color(s) are compared in their grayscale equivalencies relative to each additive color model channel (i.e., red, green, and blue) with the grayscale ratio or delta between the two utilized as the qualifying metric for determining indicium redundancy. This tends to ensure that the measured contrast ratio or delta value is greater than or equal to the theoretical contrast minimum threshold.

For example, assume a candidate component or composite process indicium color displays a grayscale equivalent value in the red channel of 13% with the associated background color(s) displaying a grayscale equivalent value of 3% in its red channel. If the theoretical contrast delta minimum threshold was 10%, the candidate component or composite process indicia color would qualify as redundant for indicia printing even if the indicia color luminescence intensity threshold was ≥15%—assuming that the candidate component or composite process indicia color was printed with the tested background color.

In an alternative embodiment, a contrast ratio methodology based on the Modified Weber's Fraction $S_i/N_b$ equation is employed as an empirical contrast metric for indicia redundancy between candidate component or composite process colors and their background or surrounding area color(s). With this alternative Modified Weber's Fraction $S_i/N_b$ equation contrast embodiment, the grayscale value of the indicium component or composite process color and the background or surrounding color(s) is determined per RGB channel as in the previous example contrast delta embodiment, but with the Modified Weber's Fraction $S_i/N_b$ equation contrast ratio embodiment, the resulting grayscale ratio effectively provides a comparison of the level of a desired signal (indicum color) to the level of background noise (background or surrounding color). A $S_i/N_b$ value greater than "1" indicates more signal than noise and equates to a theoretically legible indicia redundant component or composite process color when printed with the associated background color(s). However, as a practical matter, the minimum acceptable theoretical contrast $S_i/N_b$ value to ensure redundant indicia legibility should be sufficiently large to ensure redundant indicia legibility under most circumstances, including non-optimal environmental settings that may contribute additional noise such as bar lighting. An optimal minimum $S_i/N_b$ value is somewhat debatable, but a conservative minimum theoretical $S_i/N_b$ value for maintaining indicia redundancy would be a ratio of "3.7". As before, the $S_i/N_b$ value would first be determined discretely relative to each of the three (i.e., RGB) additive model color channels, with each channel's pass (logic "1") or fail (logic "0") redundancy test logic inclusive-OR together resulting in the overall pass or fail redundancy status for that particular indicia and background color(s) combination. In other words, any one or more of the RGB color channels passing the theoretical contrast ratio tests qualifying the component or composite process color as redundant when printed with the corresponding background. The present disclosure contemplates that other methods of determining a contrast metric (e.g., first summing the results from the RGB channels for the indicium and the background and then determining the $S_i/N_b$ value) under some circumstances can be more desirable.

FIG. 4B illustrates the previously disclosed additive model contrast testing for indicia redundancy against a known background embodiment as a multichannel flow chart 450. As illustrated in the multichannel flowchart 450, this embodiment of the disclosure is conceptually divided into four groups (i.e., "Non-Additive Model Processing" 451, "Additive Model Red Channel" 451R, "Additive Model Green Channel" 451G, and "Additive Model Blue Channel" 451B) by the four "multichannel" columns as shown in FIG. 4B.

The FIG. 4B multichannel flowchart 450 begins with the candidate component or composite indicia color and the associated background color(s) 452 submitted in digitally suitable image formats with two field of views comprised of the candidate indicium color and the associated background color(s) 452. The candidate indicium color and the associated background color(s) 452 images are each broken down by the chosen additive model into separate red 453R, green 453G, and blue 453B segments with each segment emulating the luminescent intensity as perceived by the human eye "Red", "Green", and "Blue" cone photoreceptors respectively—in FIG. 4B the parallel paths of the indicium and background color(s) processing are indicated by pairs of functional rectangles with one rectangle slightly offset and behind the other. Once the complete "white light" or "full color" images 452 have been broken down into red 453R, green 453G, and blue 453B segments, all segments are then converted to grayscale 454R, 454G, and 454B. Next, the intensity values of all the pixels in the field of view are averaged for each color channel or segment (455R, 455G, and 455B) thereby providing a single averaged metric for each discrete color channel. At this point, the candidate color is processed by the Modified Weber's Fraction with the associate background color(s) to derive a $S_i/N_b$ metric (456R, 456G, and 456B) for each of the three color channels. Then, the three derived $S_i/N_b$ metrics are compared to i theoretical threshold values to determine pass (logic "1") or fail (logic "0") test results of the candidate color and associated background color(s) for indicia redundancy (457R, 457G, and 457B). The three binary indicia redundancy test results (457R, 457G, and 457B) are then Boolean logic inclusive-OR together 458 with the single resulting output bit determining if the candidate color is suitable for indicia redundancy 459 when printed with its associated background color(s).

As in the previous embodiment, optional biases can be applied to any or all of the three color channels' derived metrics, thereby "tuning" the additive color model to more accurately reflect the perception of human eye photoreceptor cones. These optional biases can be applied after the segmentation (453R, 453G, and 453B) or grayscale conversions (454R, 454G, and 454B) processes, and/or after a $S_i/N_b$ value has been derived for each color channel.

The remainder of this specification will focus on the practical implications of these disclosures. Examples of redundant indicia colors as enabled by these disclosures are provided as well as an example of a redundant indicium that was not possible with known disclosures.

FIG. 5A provides a front elevation view of a known representative example of a 10×10 matrix 500 of one hundred process color cells with each color comprised of at least one component of CMYK. As shown in FIG. 5A, the matrix 500 is arranged in alphabetically assigned rows 501 ("A" through "J") by numerical columns 502 ("1" through "10") with each cell in the matrix 500 illustrating a different process color. The line screen percentage of each CMYK component color necessary to generate the process color of a given cell is provided in Table 1.

FIG. 5B illustrates a copy of the representative color matrix 500' of FIG. 5A in sixteen different multiple renderings arranged in a 4×4 grid 510. The sixteen different renderings of grid 510 are arranged into four rows (515 thru 518) by four columns (511 thru 514). The first row 515 renders its matrices in white light illumination that is considered normal color perception. The second row 516 renders its matrices as perceived by human eye "red" cone photoreceptors. The third row 517 renders its matrices as perceived by human eye "green" cone photoreceptors. Finally, the fourth row 518 renders its matrices as perceived by human eye "blue" cone photoreceptors. The four columns (511 thru 514) vary by how the matrices' colors are displayed, with the first column 511 rendering the matrices in color with the second 512, third 513, and fourth 514 columns rendering the matrices in grayscale. Column 512 renders the matrices of column 511 in grayscale equivalent, thus providing graphic renditions of the relative luminescence intensities of each color in the matrix as perceived: normally (column 512, row 515), by red cone photoreceptors (column 512, row 516), by green cone photoreceptors (column 512, row 517), and by blue cone photoreceptors (column 512, row 518).

TABLE 1

FIG. 5A Known Component Color Breakdown

| Row | Color | 1 | 2 | 3 | 4 | 5 | 6 | 7 | 8 | 9 | 10 |
|---|---|---|---|---|---|---|---|---|---|---|---|
| A | C | 0% | 0% | 0% | 0% | 0% | 40% | 40% | 20% | 20% | 20% |
|   | M | 0% | 0% | 0% | 0% | 0% | 0% | 0% | 0% | 0% | 0% |
|   | Y | 0% | 0% | 0% | 0% | 0% | 0% | 0% | 0% | 0% | 0% |
|   | K | 100% | 90% | 80% | 70% | 60% | 0% | 0% | 20% | 60% | 80% |
| B | C | 0% | 0% | 0% | 0% | 0% | 40% | 60% | 40% | 60% | 60% |
|   | M | 0% | 0% | 0% | 0% | 0% | 0% | 0% | 0% | 0% | 0% |
|   | Y | 0% | 0% | 0% | 0% | 0% | 0% | 0% | 20% | 40% | 60% |
|   | K | 50% | 40% | 30% | 20% | 10% | 60% | 40% | 20% | 20% | 20% |
| C | C | 0% | 0% | 0% | 0% | 0% | 40% | 60% | 40% | 60% | 60% |
|   | M | 0% | 0% | 0% | 0% | 0% | 0% | 0% | 0% | 0% | 0% |
|   | Y | 0% | 0% | 0% | 0% | 0% | 0% | 0% | 20% | 40% | 60% |
|   | K | 50% | 40% | 30% | 20% | 10% | 60% | 40% | 20% | 20% | 20% |
| D | C | 0% | 0% | 20% | 0% | 0% | 20% | 20% | 20% | 20% | 40% |
|   | M | 100% | 100% | 80% | 60% | 40% | 0% | 0% | 0% | 0% | 0% |
|   | Y | 100% | 0% | 0% | 100% | 20% | 20% | 40% | 60% | 40% | 100% |
|   | K | 0% | 0% | 20% | 0% | 0% | 40% | 40% | 20% | 20% | 0% |
| E | C | 0% | 20% | 40% | 60% | 60% | 20% | 0% | 0% | 0% | 0% |
|   | M | 20% | 20% | 40% | 40% | 60% | 0% | 0% | 0% | 0% | 0% |
|   | Y | 20% | 0% | 0% | 0% | 0% | 60% | 20% | 20% | 20% | 40% |
|   | K | 60% | 0% | 0% | 0% | 0% | 0% | 80% | 60% | 40% | 40% |
| F | C | 40% | 60% | 40% | 40% | 100% | 0% | 0% | 0% | 0% | 0% |
|   | M | 40% | 40% | 40% | 20% | 20% | 0% | 0% | 0% | 0% | 20% |
|   | Y | 0% | 0% | 0% | 0% | 0% | 60% | 60% | 40% | 20% | 40% |
|   | K | 20% | 40% | 60% | 40% | 0% | 20% | 0% | 0% | 0% | 40% |
| G | C | 0% | 0% | 0% | 0% | 0% | 0% | 0% | 0% | 0% | 0% |
|   | M | 40% | 20% | 60% | 40% | 40% | 40% | 60% | 40% | 40% | 20% |
|   | Y | 60% | 60% | 80% | 80% | 60% | 0% | 0% | 0% | 0% | 0% |
|   | K | 20% | 20% | 0% | 0% | 0% | 60% | 40% | 0% | 20% | 40% |
| H | C | 0% | 0% | 0% | 0% | 0% | 20% | 20% | 20% | 20% | 20% |
|   | M | 20% | 20% | 20% | 60% | 60% | 20% | 60% | 80% | 60% | 40% |
|   | Y | 100% | 40% | 40% | 60% | 80% | 0% | 0% | 0% | 0% | 0% |
|   | K | 0% | 0% | 60% | 40% | 20% | 20% | 20% | 0% | 0% | 20% |
| I | C | 0% | 0% | 0% | 0% | 0% | 20% | 20% | 20% | 40% | 40% |
|   | M | 60% | 40% | 20% | 40% | 60% | 40% | 0% | 40% | 60% | 100% |
|   | Y | 60% | 40% | 20% | 20% | 40% | 0% | 0% | 0% | 0% | 0% |
|   | K | 0% | 0% | 0% | 40% | 20% | 0% | 60% | 40% | 0% | 0% |
| J | C | 0% | 0% | 0% | 0% | 0% | 40% | 60% | 40% | 60% | 100% |
|   | M | 60% | 100% | 60% | 80% | 40% | 80% | 80% | 60% | 80% | 100% |
|   | Y | 20% | 60% | 40% | 40% | 20% | 0% | 0% | 0% | 0% | 100% |
|   | K | 20% | 0% | 0% | 0% | 20% | 20% | 0% | 40% | 20% | 100% |

In row 515 and columns 512 thru 514, matrix color cells that are inherently non-redundant (i.e., printed with only one inkjet head—either only one cyan head, only one magenta head, only one yellow head, or only one black head) are highlighted 519 with a blue cell containing the null set symbol (i.e., "Ø"). It should be noted, that one additional cell in matrix location C1 is also highlighted as non-redundant since it is white and is a special case simply showing the background substrate with no printing. In other words, since these highlighted process colors are printed with at most one print head and consequently at most one color, by definition these process colors are not redundant and therefore are flagged ("Ø") and removed from further consideration.

Columns 513 and 514 provide the same grayscale intensity renderings as column 512, but columns 513 and 514 also apply theoretical minimum grayscale threshold tests (i.e., 15% minimum threshold test for column 513 and a 25% minimum threshold test for column 514) to the grayscale matrices of rows: 516 (red intensity tests), 517 (green intensity tests), and 518 (blue intensity tests). Any matrix color cell failing the respective intensity test (i.e., ≤15% minimum threshold for column 513 and ≤25% for column 514) for rows 516 thru 518 is highlighted as a yellow cell 520. All matrix color cells that failed an intensity test in rows 516 (insufficient red intensity), 517 (insufficient green intensity), and 518 (insufficient blue intensity), are logically ANDed such that any color cell that failed its intensity test for all three rows (i.e., insufficient RGB intensity) is deemed to be non-redundant and is highlighted 521 in row 515 columns 513 and 514 as a red cell containing the null set symbol ("Ø"). Thus, all remaining colors not covered by a colored cell with a null set symbol ("Ø") in row 515 columns 513 and 514 matrices would be considered redundant in this example 510.

For clarity, it should be noted that example 510 of FIG. 5B disqualified a particular color cell in its matrix only when the same color cell failed the threshold test for all three color channels (RGB)—i.e., logic AND of three separate threshold failures. This is identical to the disclosure examples of FIGS. 4A thru 4C (400, 450, and 470 respectively) where the outputs of the three threshold tests (407R, 407G, and 407B for FIG. 4A; or 457R, 457G, and 457B for FIG. 4B; or 477R, 477G, and 477B for FIG. 4C) are logic ORed together (408 FIG. 4A, 458 FIG. 4B, and 478 of FIG. 4C). The difference is in the example 510 of FIG. 5B the failures are logic ANDed and in the examples 400, 450, and 470 of FIGS. 4A, 4B and 4C the successes are logic ORed—i.e., the same outcome.

While example 510 of FIG. 5B does demonstrate the essential concepts of the disclosure as well as disqualifying the matrix 500' color cells that are inherently non-redundant (i.e., process colors produced with at most one print head) as well as some composite process colors that lack the intensity to be employed to print redundant indicia (e.g., 521), it only evaluates process colors as printed with no regard to the component colors that make up the resulting composite process colors. For example, matrix 500 color cell "A7" or "Light Blue Green" (see FIG. 5A) is comprised of 20% cyan, 0% magenta, 0% yellow, and 20% black component colors. Most likely, either 20% cyan by itself would fall below the 15% theoretical intensity threshold and would definitely fall below the 25% theoretical intensity threshold, thereby making the color unsuitable for redundant indicia printing, since cyan by itself would exhibit insufficient luminescence intensity to be legible on its own. Yet, as illustrated in row 515 and columns 513 and 514 of FIG. 5B, color cell "A7" ("Light Blue Green") is illustrated as inherently redundant as cell "J10" or "Rich Black" which with 100% cyan, 100% magenta, 100% yellow, and 100% black component colors is the most redundant composite process color possible for a four color (i.e., CMYK) process. The reason color cell "A7" or "Light Blue Green" is confirmed as redundant, is the exemplary illustration 510 of FIG. 5B only evaluates the resulting composite process color and not the component colors that make up cell "A7." Therefore, to determine if a composite process color is truly suitable for printing redundant indicia, a separate analysis must be conducted in this embodiment on each of its component colors.

Figure 5C:
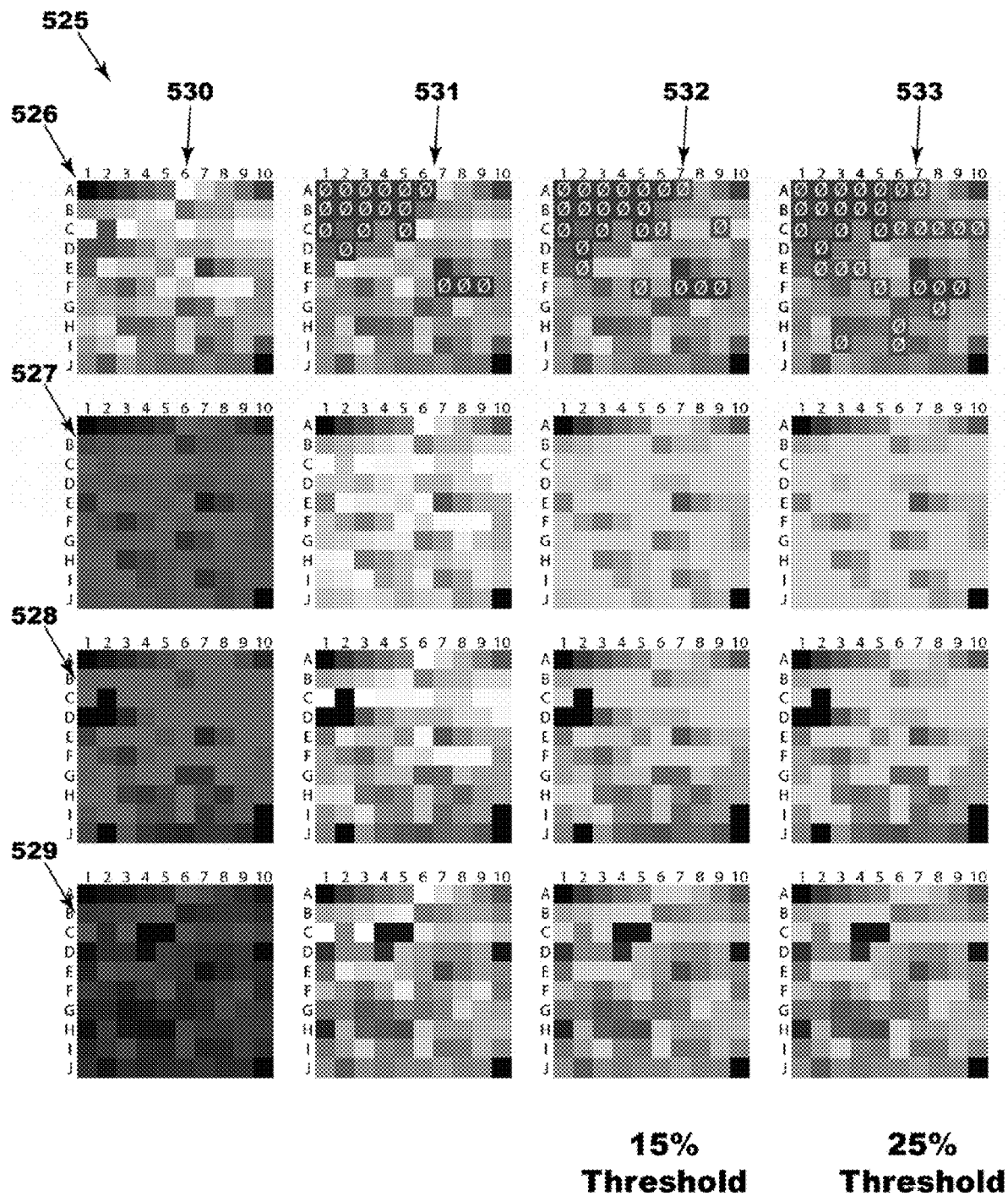
FIG. 5C is a front view of the representative example matrix of process colors of FIG. 5A without a cyan subtractive process component color as perceived by an additive color model with non-redundant colors highlighted.

FIG. 5C illustrates 525 the same sixteen different multiple renderings of the representative color matrix 500 of FIG. 5A arranged in a similar 4×4 grid as 510 of FIG. 5B. However, with 525 of FIG. 5C the color cyan has been removed from all of the process color cells of the matrices. Thus, for colors employing 0% cyan, no difference from 510 of FIG. 5B will be observed, but composite process colors that do employ any percentage of cyan in printing will appear different in 525 of FIG. 5B. Consequently, the illustration of 525 of FIG. 5C isolates and highlights the composite process colors that fail indicia redundancy testing when the color cyan fails to print.

Similar to the description of FIG. 5B, in 525 of FIG. 5C the first row 526 renders the matrices in white light illumination, the second row 527 renders the matrices as perceived by human eye "red" cone photoreceptors, the third row 528 renders the matrices as perceived by human eye "green" cone photoreceptors, and the fourth row 529 renders the matrices as perceived by human eye "blue" cone photoreceptors. The four columns (530 thru 533) vary by how the matrices' colors are displayed, with the first column 530 rendering the matrices in color with the second 531, third 532, and fourth 533 columns rendering the matrices in grayscale.

In row 526 and columns 531 thru 533, as before matrix color cells that are inherently non-redundant (i.e., printed with at most with one inkjet head) are highlighted with a blue cell containing the null set symbol ("Ø"). Columns 532 and 533 provide the same grayscale intensity renderings as column 531, but columns 532 and 533 also apply theoretical minimum grayscale threshold tests (i.e., 15% minimum threshold test for column 532 and a 25% minimum threshold test for column 533) to the grayscale matrices of rows: 527 (red intensity tests), 528 (green intensity tests), and 529 (blue intensity tests). Any matrix color cell failing the respective intensity test for rows 527 thru 529 is highlighted as a yellow cell. All matrix color cells that failed an intensity test in all three rows (527 thru 529) are deemed to be non-redundant and are highlighted in row 526 columns 532 and 533 as a red cell containing the null set symbol ("Ø"). Thus, all remaining colors not covered by a colored cell with a null set symbol ("Ø") in row 526 columns 532 and 533 matrices would be considered redundant in this example 525.

Figure 5D:
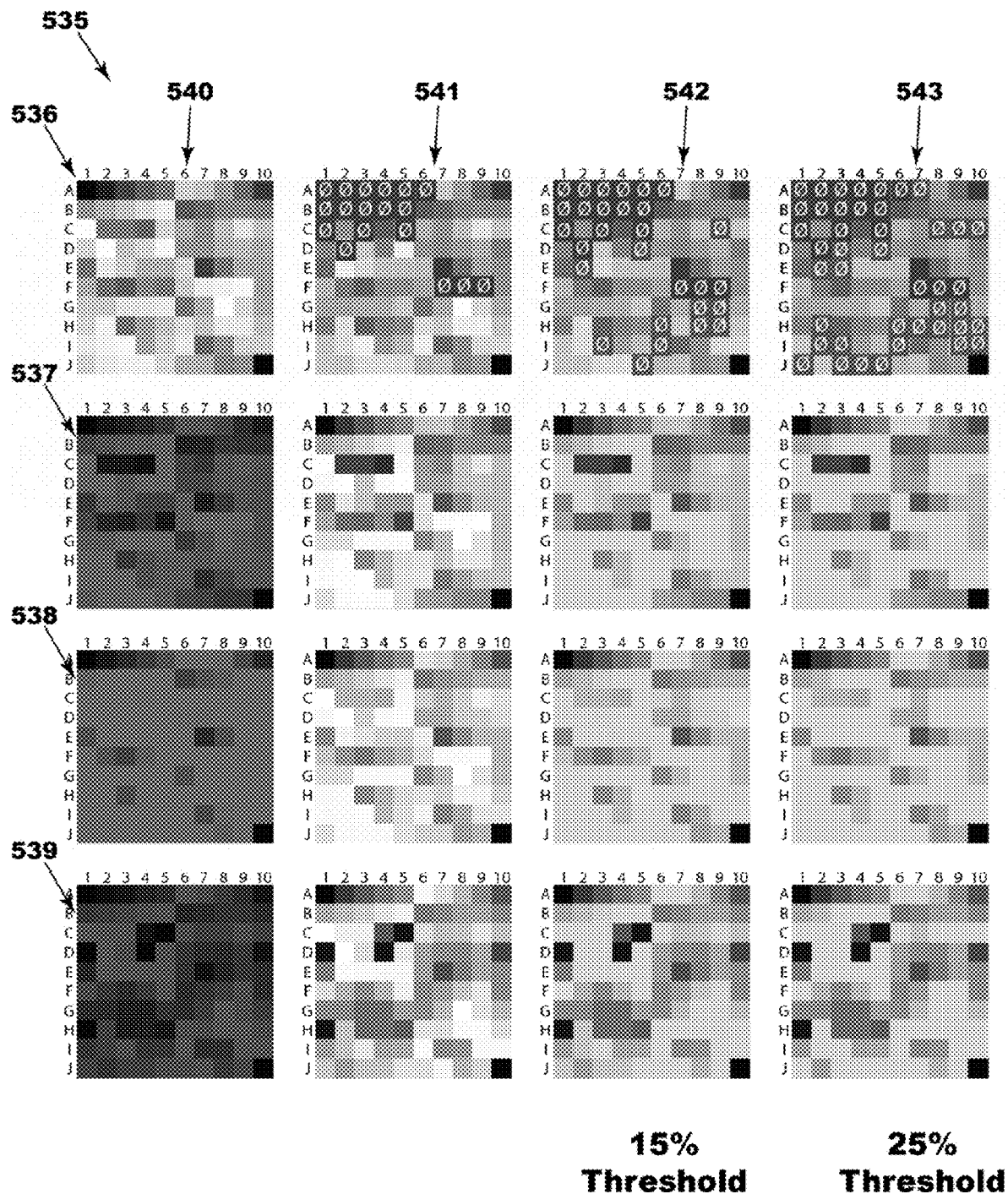
FIG. 5D is a front view of the representative example matrix of process colors of FIG. 5A without a magenta subtractive process component color as perceived by an additive color model with non-redundant colors highlighted.

FIG. 5D illustrates 535 the same sixteen different multiple renderings of the representative color matrix 500 of FIG. 5A arranged in a similar 4×4 grid; however, with 535 of FIG. 5D the color magenta has been removed from all of the process color cells of the matrices. Consequently, the illustration of 535 of FIG. 5D isolates and highlights the composite process colors that fail indicia redundancy testing when the color magenta fails to print.

As before, in 535 the first row 536 renders the matrices in white light illumination, the second row 537 renders the matrices as perceived by human eye "red" cone photoreceptors, the third row 538 renders the matrices as perceived by human eye "green" cone photoreceptors, and the fourth row 539 renders the matrices as perceived by human eye "blue" cone photoreceptors. The four columns 540 thru 543 vary by how the matrices' colors are displayed, with the first column 540 rendering the matrices in color with the second 541, third 542, and fourth 543 columns rendering the matrices in grayscale.

In row 536 and columns 541 thru 543, matrix color cells that are inherently non-redundant (i.e., printed with at most with one inkjet head) are highlighted with a blue cell containing the null set symbol ("Ø"). Columns 542 and 543 provide the same grayscale intensity renderings as column 541, but columns 542 and 543 also apply theoretical minimum grayscale threshold tests (i.e., 15% minimum threshold test for column 542 and a 25% minimum threshold test for column 543) to the grayscale matrices of rows: 537 (red intensity tests), 538 (green intensity tests), and 539 (blue intensity tests). Any matrix color cell failing the respective intensity test for rows 537 thru 539 is highlighted as a yellow cell. All matrix color cells that failed an intensity test in all three rows (537 thru 539) are deemed to be non-redundant and are highlighted in row 536 columns 542 and 543 as a red cell containing the null set symbol ("Ø"). Thus, all remaining colors not covered by a colored cell with a null set symbol ("Ø") in row 536 columns 542 and 543 matrices would be considered redundant in this example 535.

Figure 5E:
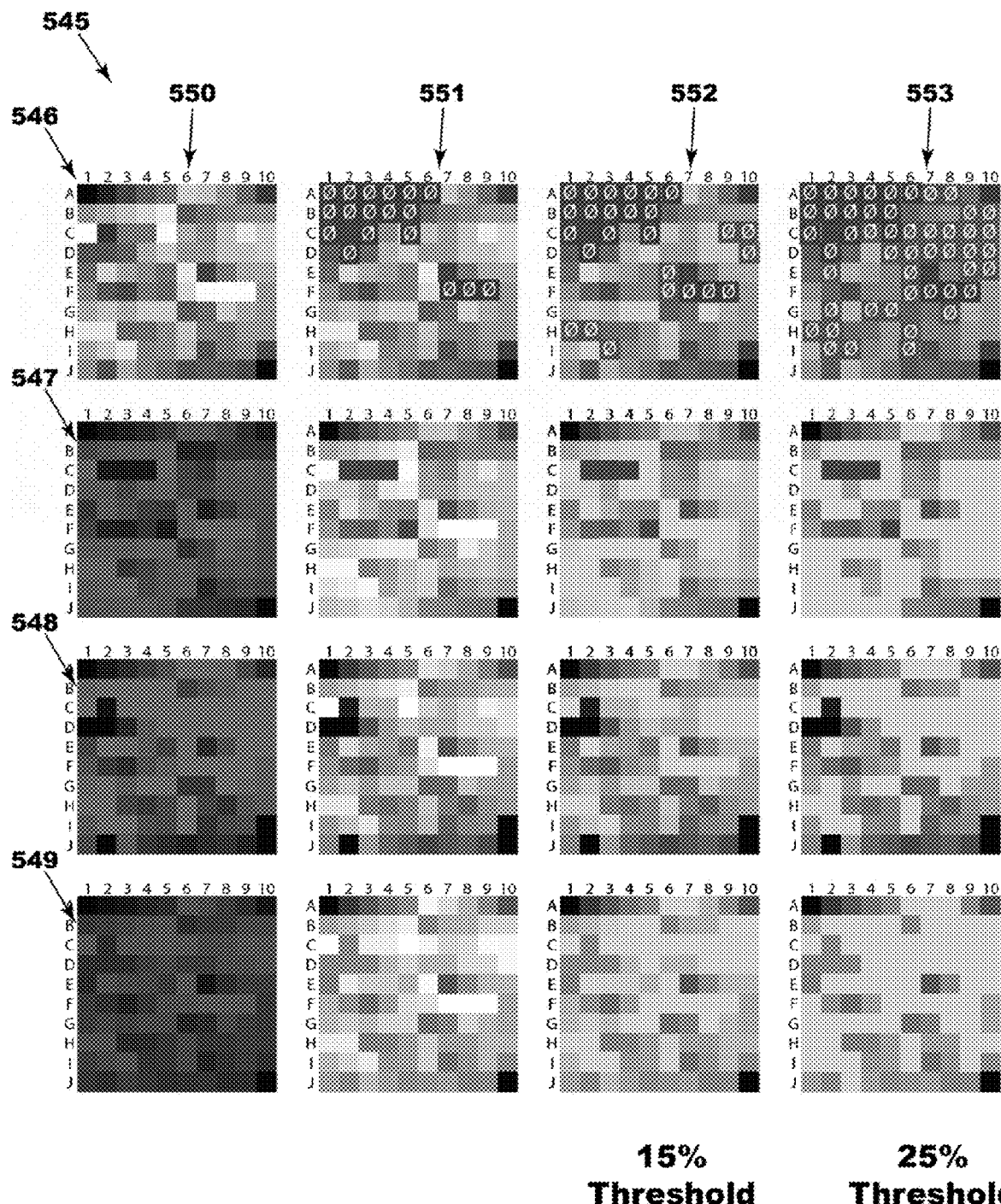
FIG. 5E is a front view of the representative example matrix of process colors of FIG. 5A without a yellow subtractive process component color as perceived by an additive color model with non-redundant colors highlighted.

Again, FIG. 5E illustrates 545 the same sixteen different multiple renderings as previously; however, with 545 of FIG. 5E the color yellow has been removed from all of the process color cells of the matrices. Consequently, the illustration of 545 of FIG. 5E isolates and highlights the composite process colors that fail indicia redundancy testing when the color yellow fails to print.

As before, in 545 the first row 546 renders the matrices in white light illumination, the second row 547 renders the matrices as perceived by human eye "red" cone photoreceptors, the third row 548 renders the matrices as perceived by human eye "green" cone photoreceptors, and the fourth row 549 renders the matrices as perceived by human eye "blue" cone photoreceptors. The four columns (550 thru 553) vary by how the matrices' colors are displayed, with the first column 550 rendering the matrices in color with the second 551, third 552, and fourth 553 columns rendering the matrices in grayscale.

In row 546 and columns 551 thru 553, matrix color cells that are inherently non-redundant (i.e., printed with only one inkjet head) are highlighted with a blue cell containing the null set symbol ("Ø"). Columns 552 and 553 provide the same grayscale intensity renderings as column 551, but columns 552 and 553 also apply a theoretical minimum grayscale threshold tests (i.e., 15% minimum threshold test for column 552 and a 25% minimum threshold test for column 553) to the grayscale matrices of rows: 547 (red intensity tests), 548 (green intensity tests), and 549 (blue intensity tests). Any matrix color cell failing the respective intensity test for rows 547 thru 549 is highlighted as a yellow cell. All matrix color cells that failed an intensity test in all three rows (547 thru 549) are deemed to be non-redundant and are highlighted in row 546 columns 552 and 553 as a red cell containing the null set symbol ("Ø"). Thus, all remaining colors not covered by a colored cell with a null set symbol ("Ø") in row 546 columns 552 and 553 matrices would be considered redundant in this example 545.

Figure 5F:
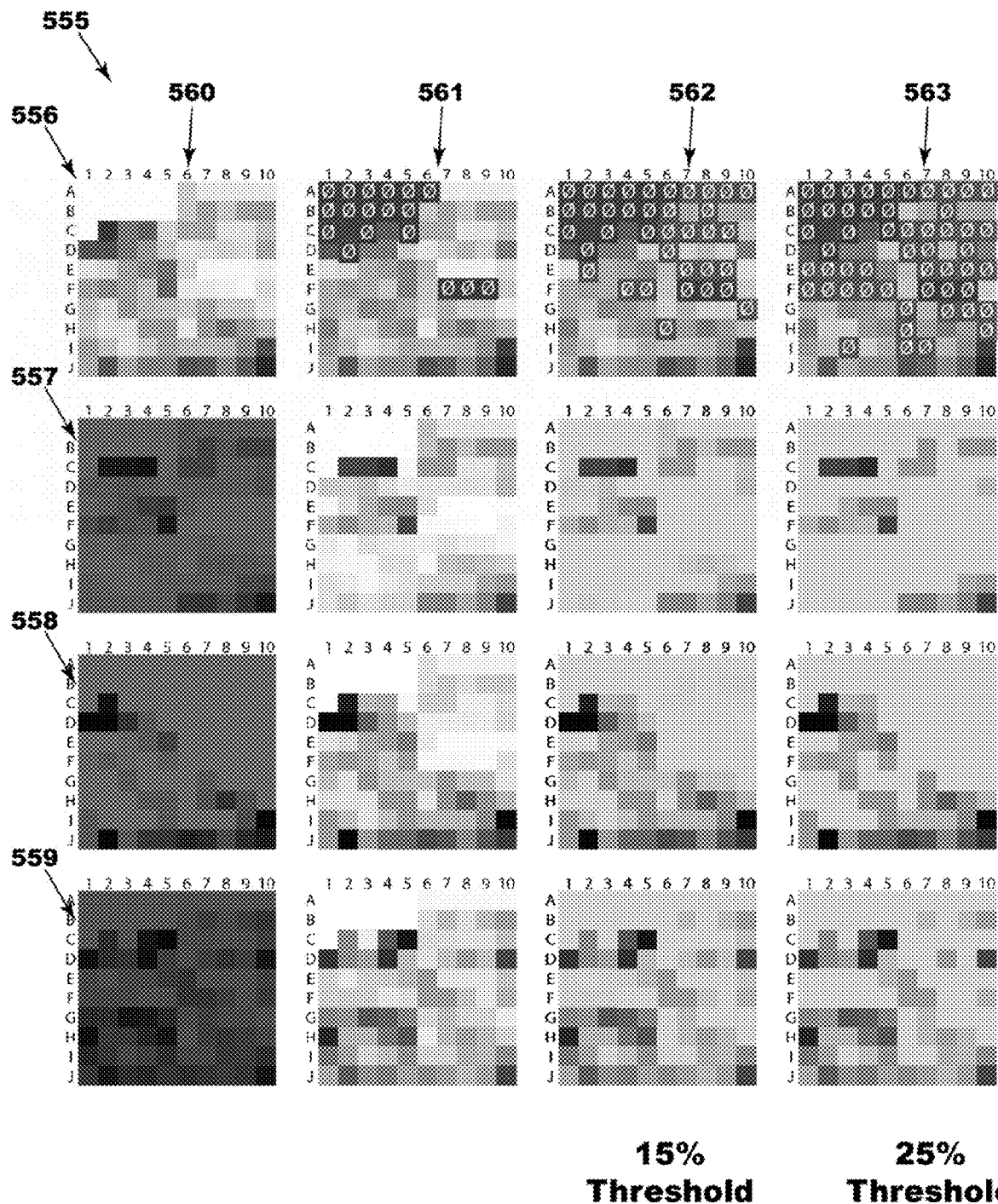
FIG. 5F is a front view of the representative example matrix of process colors of FIG. 5A without a black subtractive process component color as perceived by an additive color model with non-redundant colors highlighted.

Finally, FIG. 5F illustrates 555 the same sixteen different multiple renderings as previously; however, with 555 of FIG. 5F the color black has been removed from all of the process color cells of the matrices. Consequently, the illustration of 555 of FIG. 5F isolates and highlights the composite process colors that fail indicia redundancy testing when the color black fails to print.

As before, in 555 the first row 556 renders the matrices in white light illumination, the second row 557 renders the matrices as perceived by human eye "red" cone photoreceptors, the third row 558 renders the matrices as perceived by human eye "green" cone photoreceptors, and the fourth row 559 renders the matrices as perceived by human eye "blue" cone photoreceptors. The four columns (560 thru 563) vary by how the matrices' colors are displayed, with the first column 560 rendering the matrices in color with the second 561, third 562, and fourth 563 columns rendering the matrices in grayscale.

In row 556 and columns 561 thru 563, matrix color cells that are inherently non-redundant (i.e., printed with at most one inkjet head) are highlighted with a blue cell containing the null set symbol ("Ø"). Columns 562 and 563 provide the same grayscale intensity renderings as column 561, but columns 562 and 563 also apply i theoretical minimum grayscale threshold tests (i.e., 15% minimum threshold test for column 562 and a 25% minimum threshold test for column 563) to the grayscale matrices of rows: 557 (red intensity tests), 558 (green intensity tests), and 559 (blue intensity tests). Any matrix color cell failing the respective intensity test for rows 557 thru 559 is highlighted as a yellow cell. All matrix color cells that failed an intensity test in all three rows (557 thru 559) are deemed to be non-redundant and are highlighted in row 556 columns 562 and 563 as a red cell containing the null set symbol ("Ø"). Thus, all remaining colors not covered by a colored cell with a null set symbol ("Ø") in row 556 columns 562 and 563 matrices would be considered redundant in this example 555.

Having previously identified the matrix color cells that are inherently non-redundant (i.e., printed with only one inkjet head—highlighted with a blue cell containing the null set symbol "Ø") as well as the matrix color cells that are non-redundant composite process colors when either the component color cyan, magenta, yellow, or black fail to print; it remains to identify the matrix composite process color cells that are redundant for printing indicia—i.e., composite process colors where the indicia remain legible if any one component color fails to print. The most expedient method to identify the matrix composite process color cells that are redundant for printing indicia is to first identify and flag the non-redundant matrix composite process color cells from the previous examples, consequently, all remaining (i.e., non-flagged) matrix composite process color cells would then designate the colors that are redundant for printing indicia.

Figure 5G:
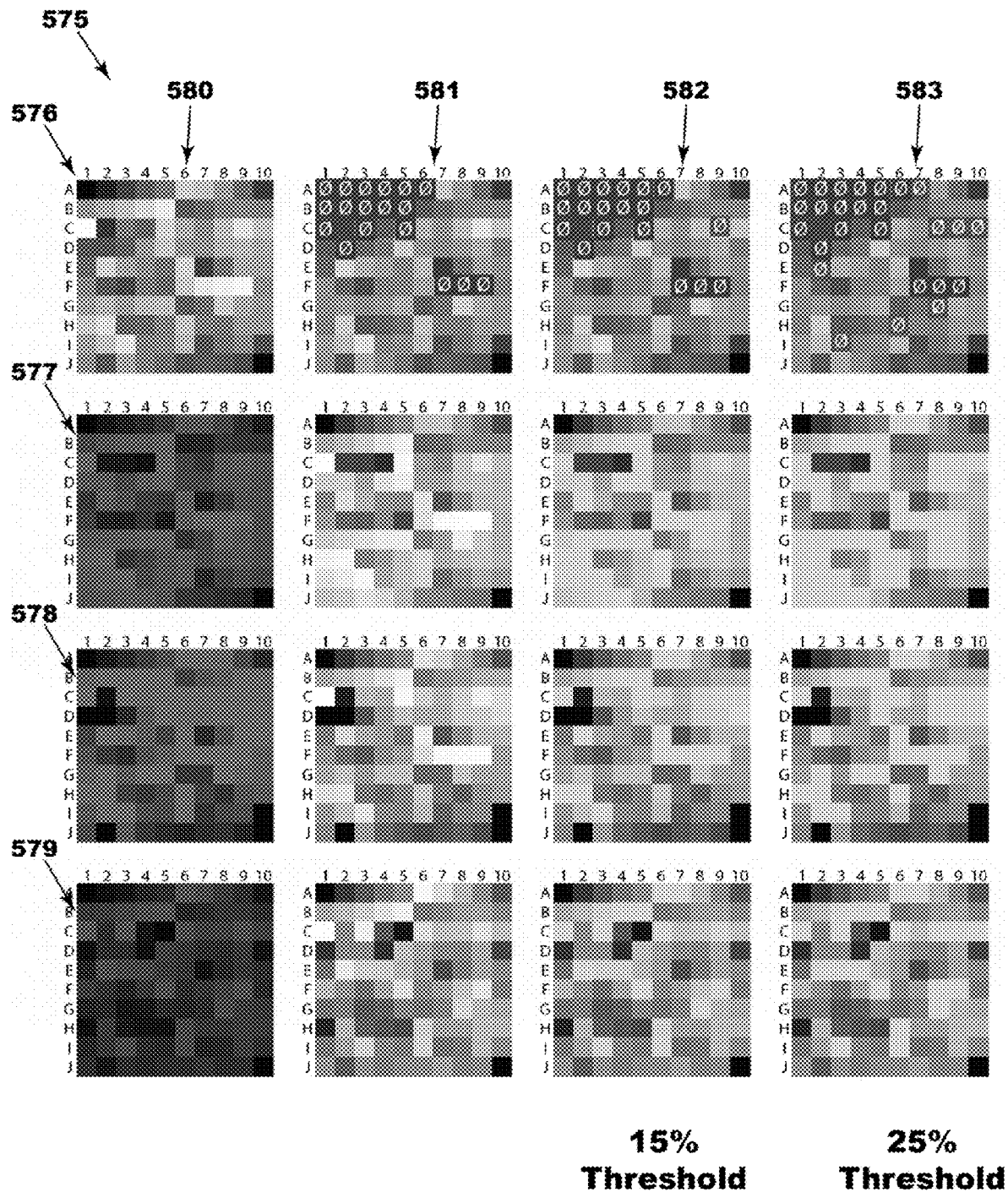
FIG. 5G is a front view of the representative example matrix of process colors of FIG. 5A with all non-redundant colors highlighted.

Since FIGS. 5C thru 5F have already identified the matrix composite process color cells that fail luminescence threshold tests when either the component color cyan (FIG. 5C), magenta (FIG. 5D), yellow (FIG. 5E), or black (FIG. 5F) fail to print; logically ANDing the failed matrix color cells from all four figures with any matrix composite process color cell failing on all four figures identified as non-redundant and highlighted in row 576 columns 582 and 583 of FIG. 5G with a red cell containing the null set symbol ("Ø").

Thus, FIG. 5G illustrates 575 the same sixteen different multiple renderings, highlighting the overall non-redundant colors. In 575 the first row 576 renders the matrices in white light illumination, the second row 577 renders the matrices as perceived by human eye "red" cone photoreceptors, the third row 578 renders the matrices as perceived by human eye "green" cone photoreceptors, and the fourth row 579 renders the matrices as perceived by human eye "blue" cone photoreceptors. The four columns (580 thru 583) vary by how the matrices' colors are displayed, with the first column 580 rendering the matrices in color with the second 581, third 582, and fourth 583 columns rendering the matrices in grayscale.

In row 576 and columns 581 thru 583, matrix color cells that are inherently non-redundant (i.e., printed with at most one inkjet head) are highlighted with a blue cell containing the null set symbol ("Ø"). Columns 582 and 583 provide the same grayscale intensity renderings as column 581, but columns 582 and 583 also apply i a theoretical minimum grayscale threshold tests (i.e., 15% minimum threshold test for column 582 and a 25% minimum threshold test for column 583) to the grayscale matrices of rows: 577 (red intensity tests), 578 (green intensity tests), and 579 (blue intensity tests). Any matrix color cell failing the respective intensity test for rows 577 thru 579 is highlighted as a yellow cell. However, in example 575 of FIG. 5G, the yellow flagged failed cells of 577 thru 579 represent matrix color cells that fail luminescence threshold tests when the component color cyan (FIG. 5C), magenta (FIG. 5D), yellow (FIG. 5E), or black (FIG. 5F) fail to print logically ANDing the failed matrix color cells from all four figures resulting in any matrix composite process color cell failing on all four figures being non-redundant for indicia printing and highlighted in row 576 columns 582 and 583 of FIG. 5G with a red cell containing the null set symbol ("Ø").

Figure 6:
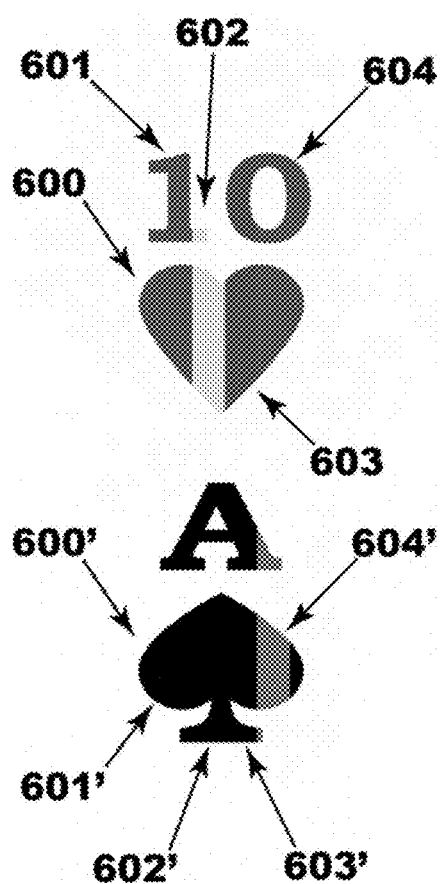
FIG. 6 is a front view of a representative example of modified lottery-type instant ticket indicia comprised of multiple (i.e., process color) ink applications of at least two different colors for redundancy relative to human photoreceptor perspective in accordance with one example embodiment of the present disclosure.

Thus, with the redundant indicia composite process colors enabled by the present disclosure with respect to human eye photoreceptor legibility, the pool of possible redundant composite process colors is modified and can be increased over known systems. For example, FIG. 6 depicts two representative examples of lottery-type instant ticket indicia comprised of composite process color ink applications for redundancy. Indicium 600 exemplifying redundant printing with a "red" composite process color (i.e., 0% cyan, 100% magenta, 100% yellow, and 0% black) as enabled by the present disclosure and indicium 601' exemplifying redundant printing with a known "rich black" composite process color (i.e., 100% cyan, 100% magenta, 100% yellow, and 100% black). Redundant indicium 600 (i.e., a red card symbol) was not possible under known additive model redundancy methods, since the color "red" composite process color is typically comprised of two component colors (i.e., 100% magenta and 100% yellow) and with known methods, 100% yellow was deemed to be unsuitable for indicia redundancy purposes—e.g., FIG. 1F, callouts 131 and 132.

To better illustrate how both indicium 600 and known indicium 600' are both embodiments of redundantly printed indicia, FIG. 6 also includes three simulated color misprints—602 thru 604 and 602' thru 604'. The correctly printed portions 601 and 601' illustrate how the two indicia would appear with no misprints. The misprints illustrated in 602 and 602' are a simulation of how the two indicia would appear to a human eye if the magenta print head failed to print, the misprints illustrated in 603 and 603' are a simulation of how the two indicia would appear to a human eye if the yellow print head failed to print, and the misprints illustrated in 604 and 604' are a simulation of how the two indicia would appear to a human eye if the cyan print head failed to print. As is readily apparent in the redundant variable indicia 600 and 600' of FIG. 6, the absence of any these three component colors still leaves both indicia 600 and 600' easily legible to a human observer in its intended form. Thus, the redundant printing of the composite process colors alleviates any reasonable misinterpretation of the information conveyed by the variable indicia 600 and 600'.

Figure 7:
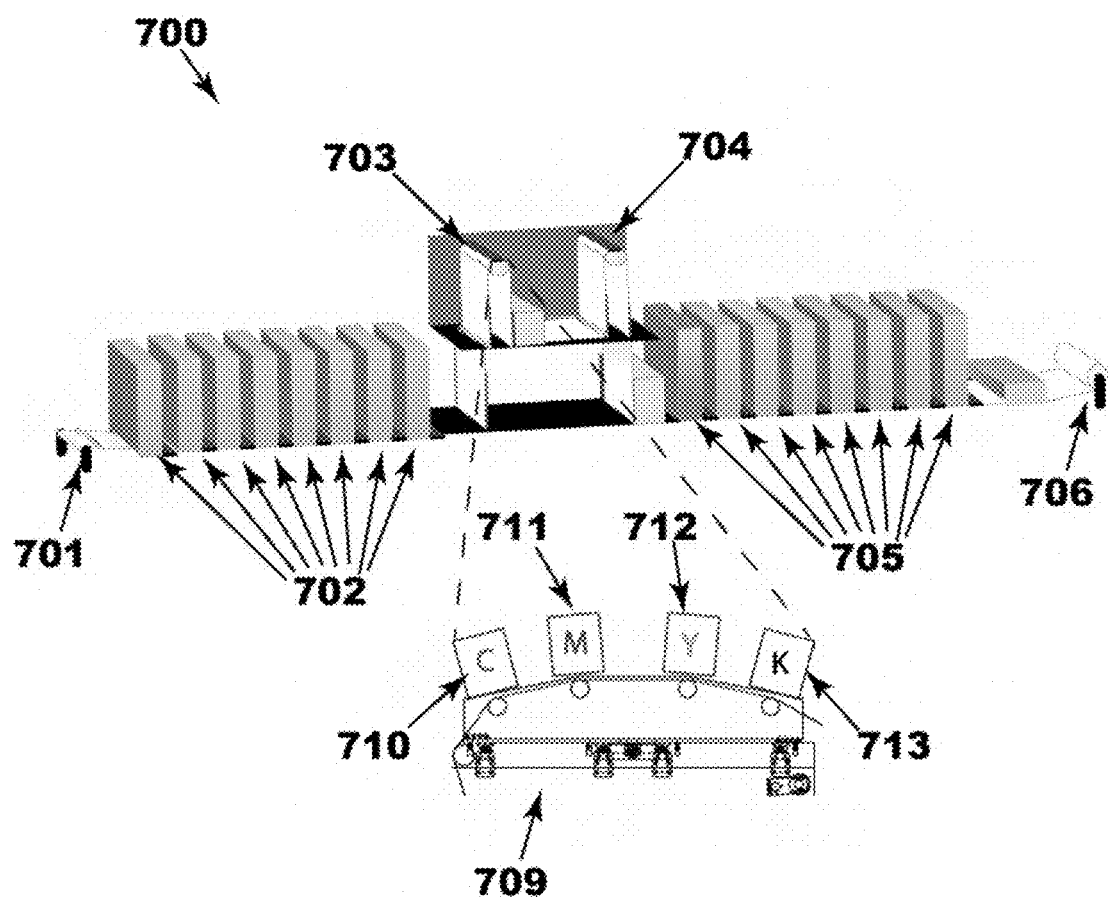
FIG. 7 is a schematic front isometric view of an exemplary embodiment of an inline redundant digital imager capable of printing the exemplary redundant instant ticket variable indicia of FIG. 6.

One possible press configuration 700 capable of producing the redundant variable indicia embodiments of FIG. 6 is illustrated in FIG. 7. As shown in FIG. 7, press configuration 700 illustrates a hybrid flexographic and digital imager printing press used to produce variable indicia SOC secured documents. The industry press 700 unravels its paper web substrate from a roll 701 and flexographically prints 702 lower security coatings and a primer in the scratch-off area as well as optionally prints display (i.e., the region on the front of the SOC document not covered by SOC) and the back of the document's non-variable information. At this point, the press web enters a typically secured imager room where the variable indicia are applied by an imager 703. However, in view of this disclosure, the imager employed would be a process color imager 709 (e.g., Memjet® Duralink) instead of the typical monochromatic imager. The process color imager 709, having the advantage of inherent redundancy, since the imager is equipped with multiple physically discrete print heads (e.g., cyan 710, magenta 711, yellow 712, and black 713 as illustrated in 700) that operate independent of each other such that a failure (e.g., clogged inkjet head) in one print head will not impact the operation of the remaining print heads. Thus, with the present disclosure, the variable indicia in the SOC protected document is printed redundantly via the plurality of discrete print heads (typical of process color) so long as the composite process color(s) chosen for imaging the indicia are comprised of at least two different component colors where each component color is legible to human eye photoreceptors.

The remainder of press configuration 700 can remain typical of the industry standard for producing SOC protected documents with a second, typically monochromatic, imager 704 utilized to print the variable information presented on the back of the SOC protected document (e.g., inventory barcode). Subsequently, a series of flexographic print stations 705 print the upper security layers of a SOC document (e.g., a clear release coat, an upper blocking black coat, a white coating) as well as the decorative overprint (i.e., the process color or spot colors applied as an image or pattern on top of the scratch-off portion) with the web typically being rewound into a roll 706 for storage and ultimate processing by a separate packaging line.

It should be appreciated from the above that various embodiments of the present disclosure provide a system and method for determining and making redundantly printed process color variable indicum conveying variable information. In various embodiments, such process color variable indicum include a plurality of component colors with each component color determined with a grayscale equivalent level greater than a predetermined minimum threshold when viewed in any of red, green, or blue channels of an additive color model, such that at least two of the component colors comprising the variable indicum coveys a meaning of the variable information of the process color variable indicum when viewed in at least one channel of the additive color model. In various such embodiments, the system and method further include providing a scratch-off coating covering at least a portion of such printed variable indicia.

It should be appreciated from the above that various embodiments of the present disclosure provide a method for producing a redundantly printed security-enhanced document including a substrate with process color variable indicia representing variable information and printed on the substrate, wherein the process color variable indicia include a plurality of component colors. In various such embodiments, the method includes determining a variable indicia illuminating light color temperature. In various such embodiments, the method includes determining, utilizing an additive color model, a grayscale equivalent level of each component color of the process color variable indicia with each of Red, Green, and Blue (RGB) channels. In various such embodiments, the method includes determining each of the component colors of the process color variable indicia to ensure that the component colors exhibit a grayscale equivalent level greater than or equal to a predetermined threshold in at least one channel of an additive color model, such that a failure of the printing any one of the component colors of the process color variable indicia does not alter a meaning of the variable information represented by the other component color of the variable indicia. In various such embodiments, the method includes sending instructions intended to cause print heads to print the component colors to form the process color variable indicia on the substrate with separate print heads. In various such embodiments, the method includes applying a scratch-off coating covering at least a portion of the process color variable indicia. In various such embodiments, the predetermined threshold is 15% grayscale equivalent in at least one channel of the additive color model. In various such embodiments, the predetermined threshold is 25% grayscale equivalent in at least one channel of the additive color model. In various such embodiments, the method includes printing the process color variable indicia in four colors. In various such embodiments, the variable information relates to an intended value. In various such embodiments, the variable indicia are alphanumeric characters. In various such embodiments, the variable indicia are icons or figures. In various such embodiments, the additive color model is Adobe Photoshop (Red, Green, Blue) RGB, 8-bit. In various such embodiments, the additive color model is an Adobe Photoshop RGB, 8-bit, profile with a blue channel gamut that is attenuated 7% and a red channel gamut that is attenuated 3%. In various such embodiments, the method the illuminating light color temperature is 3,200° Kelvin (K). In various such embodiments, the method includes digitally emulating the illuminating light color temperature of 3,200° Kelvin (K) using an Adobe Photoshop RGB, 8-bit, profile.

It should be appreciated from the above that various embodiments of the present disclosure provide a redundantly printed security-enhanced document that includes a substrate, process color variable indicia representing variable information printed on the substrate, and a scratch-off coating covering at least a portion of the process color variable indicia. In various such embodiments, the process color variable indicia includes a plurality of component colors, each component color selected to manifest a grayscale equivalent level greater than a predetermined minimum threshold when viewed in any of red, green, or blue channels of an additive color model, such that at least two of the component colors of the process color variable indicia covey a meaning of the variable information of the process color variable indicia when viewed in at least one channel of the additive color model. In various such embodiments, the additive color model is Adobe Photoshop (Red, Green, Blue) RGB, 8-bit. In various such embodiments, the additive color model includes a blue channel color gamut that is attenuated 7% and a red channel color gamut that is attenuated 3%. In various such embodiments, the predetermined minimum threshold is at least a 15% grayscale equivalent in at least one channel of the additive color model. In various such embodiments, the predetermined minimum threshold is at least a 25% grayscale equivalent in at least one channel of the additive color model. In various such embodiments, the process color variable indicia is printed with four process colors. In various such embodiments, the variable information relates to an intended value. In various such embodiments, the process color variable indicia are icons or figures.

The present disclosure contemplates other variations of the disclosed embodiments (e.g., process color indicia images comprised of a balance of at least two different colors, etc.) that would be apparent to anyone skilled in the art in view of the present disclosure and would be within the parameters of the appended claims.

What is claimed is:

1. A redundantly printed security-enhanced document comprising:
   a substrate;
   process color variable indicia representing variable information printed on the substrate, the process color variable indicia comprising a plurality of component colors, each component color manifesting a level greater than a predetermined minimum Signal-to-Noise-ratio threshold relative to the substrate background surrounding the variable indicia when viewed in any of red, green, or blue channels of an additive color model as calculated by a Modified Weber's Fraction equation, such that at least two of the component colors of the process color variable indicia covey a meaning of the variable information when viewed in at least one channel of the additive color model; and
   a scratch-off coating covering at least a portion of the process color variable indicia.

2. The redundantly printed security-enhanced document of claim 1, wherein the additive color model comprises Adobe Photoshop Red, Green, Blue (RGB) 8-bit.

3. The redundantly printed security-enhanced document of claim 2, wherein the additive color model comprises a blue channel color gamut that is attenuated 7% and a red channel color gamut that is attenuated 3%.

4. The redundantly printed security-enhanced document of claim 1, wherein the predetermined minimum Signal-to-Noise-ratio threshold relative to the background of the substrate surrounding the variable indicia is at least a "3.7" in at least one channel of the additive color model.

5. The redundantly printed security-enhanced document of claim 1, wherein the predetermined minimum Signal-to-Noise-ratio threshold relative to the background of the substrate surrounding the variable indicia is at least a "5" in at least one channel of the additive color model.

6. The redundantly printed security-enhanced document of claim 1, wherein the process color variable indicia is printed with four process colors.

7. The redundantly printed security-enhanced document of claim 1, wherein the variable information relates to an intended value of the redundantly printed security-enhanced document.

8. The redundantly printed security-enhanced document of claim 1, wherein the process color variable indicia comprise one of an icon and a figure.

9. A method of producing a redundantly printed security-enhanced document comprising a substrate with process color variable indicia representing variable information printed on the substrate, the process color variable indicia comprising a plurality of component colors, the method comprising:
   determining a variable indicia illuminating light color temperature;
   determining, utilizing an additive color model, a grayscale equivalent level of each component color of the process color variable indicia with each Red, Green, and Blue (RGB) channels;
   determining each of the component colors of the process color variable indicia to ensure that the component colors exhibit a level greater than or equal to a predetermined Signal-to-Noise-ratio threshold relative to a background of the substrate surrounding the variable indicia when viewed in any of red, green, or blue channels of an additive color model as calculated by a Modified Weber's Fraction equation in at least one channel of the additive color model, such that a failure of the printing any one of the component colors of the process color variable indicia does not alter a meaning of the variable information represented by the other component color of the variable indicia;
   sending instructions intended to cause print heads to print the component colors to form the process color variable indicia on the substrate with separate print heads; and
   applying a scratch-off coating covering at least a portion of the process color variable indicia.

10. The method of claim 9, wherein the predetermined minimum Signal-to-Noise-ratio threshold relative to the background of the substrate surrounding the variable indicia is at least a "3.7" in at least one channel of the additive color model.

11. The method of claim 9, wherein the predetermined minimum Signal-to-Noise-ratio threshold relative to the background of the substrate surrounding the variable indicia is at least a "5" in at least one channel of the additive color model.

12. The method of claim 9, which comprises printing the process color variable indicia in four colors.

13. The method of claim 9, wherein the variable information relates to an intended value of the redundantly printed security-enhanced document.

14. The method of claim 9, wherein the variable indicia comprise alphanumeric characters.

15. The method of claim 9, wherein the variable indicia comprise one of an icon and a figure.

16. The method of claim 9, wherein the additive color model comprises Adobe Photoshop Red, Green, Blue (RGB) 8-bit.

17. The method of claim 16, wherein the additive color model comprise an Adobe Photoshop RGB, 8-bit, profile with a blue channel gamut that is attenuated 7% and a red channel gamut that is attenuated 3%.

18. The method of claim 9, wherein the illuminating light color temperature is 3,200° Kelvin (K).

19. The method of claim 18, which comprises digitally emulating the illuminating light color temperature of 3,200° Kelvin (K) using an Adobe Photoshop Red, Green, Blue (RGB) 8-bit profile.

20. A document comprising:
a substrate;
redundantly printed process color variable indicia conveying variable information printed on the substrate, the process color variable indicum comprising a plurality of component colors with each component color determined with a level greater than a predetermined minimum Signal-to-Noise-ratio threshold relative to a background of the substrate surrounding the variable indicia when viewed in any of red, green, or blue channels of an additive color model as calculated by a Modified Weber's Fraction equation, such that at least two of the component colors comprising the variable indicum coveys a meaning of the variable information of the process color variable indicia when viewed in at least one channel of the additive color model; and
a scratch-off coating covering a portion of the process color variable indicia.

\* \* \* \* \*